United States Patent
Akashika

(10) Patent No.: US 10,672,007 B2
(45) Date of Patent: Jun. 2, 2020

(54) PAYMENT SYSTEM, PAYMENT TERMINAL, PAYMENT METHOD, PAYMENT PROGRAM, AND COMPUTER-READABLE RECORDING MEDIUM FOR RECORDING SAME PROGRAM

(71) Applicant: Rakuten, Inc., Tokyo (JP)

(72) Inventor: Hideki Akashika, Setagaya-ku (JP)

(73) Assignee: Rakuten, Inc., Tokyo (JP)

(*) Notice: Subject to any disclaimer, the term of this patent is extended or adjusted under 35 U.S.C. 154(b) by 502 days.

(21) Appl. No.: 15/460,832

(22) Filed: Mar. 16, 2017

(65) Prior Publication Data
US 2017/0186000 A1 Jun. 29, 2017

Related U.S. Application Data

(63) Continuation-in-part of application No. 14/007,888, filed as application No. PCT/JP2012/075413 on Oct. 1, 2012, now abandoned.

(30) Foreign Application Priority Data

Sep. 30, 2011 (JP) .................................. 2011-218434

(51) Int. Cl.
*G06Q 40/00* (2012.01)
*G06Q 20/40* (2012.01)
(Continued)

(52) U.S. Cl.
CPC ......... *G06Q 20/405* (2013.01); *G06Q 20/227* (2013.01); *G06Q 20/3223* (2013.01);
(Continued)

(58) Field of Classification Search
CPC .. G06Q 10/02; G06Q 20/38–40; G06Q 30/02; G06Q 20/20; G06Q 20/40; G06Q 20/10; G06Q 20/32
(Continued)

(56) References Cited

U.S. PATENT DOCUMENTS 8,195,576 B1* 6/2012 Grigg et al. ........... G06Q 20/20
380/229
2006/0246871 A1* 11/2006 Takeshita ............... G06Q 20/32
455/408

(Continued)

FOREIGN PATENT DOCUMENTS

JP 2009-176065 A 8/2009

OTHER PUBLICATIONS

Translation of International Preliminary Report on Patentability dated Apr. 10, 2014 issued in Application No. PCT/JP2012/075413.

*Primary Examiner* — Mike Anderson
(74) *Attorney, Agent, or Firm* — Sughrue Mion, PLLC

(57) ABSTRACT

A settlement system includes a mobile terminal including a plurality of payment means for performing the payment process, and a reader/writer including an acquisition unit that sequentially inquires to the mobile terminal about each of a plurality of acceptable payment means and accepting a payment with one payment means specified among payment means confirmed to be present by the settlement acquisition unit by using a settlement unit corresponding to the one payment means, the mobile terminal further including a storage means that stores limitation information, and the reader/writer further includes a limitation information acquisition means that acquires the limitation information stored in the storage means, and an electronic money type narrowing down unit that stops inquiries by the acquisition unit when presence of payment means limited by the limitation information acquired by the limitation information acquisition means is confirmed by the acquisition unit.

9 Claims, 15 Drawing Sheets

(51) Int. Cl.
*G06Q 20/32* (2012.01)
*G06Q 20/36* (2012.01)
*G06Q 20/22* (2012.01)

(52) U.S. Cl.
CPC ..... *G06Q 20/3224* (2013.01); *G06Q 20/3229* (2013.01); *G06Q 20/367* (2013.01)

(58) Field of Classification Search
USPC ..................................................... 705/44, 39
See application file for complete search history.

(56) References Cited

U.S. PATENT DOCUMENTS

| | | | | |
|---|---|---|---|---|
| 2011/0184858 | A1* | 7/2011 | Shakkarwar | G06Q 20/10 |
| | | | | 705/39 |
| 2011/0251892 | A1* | 10/2011 | Laracey | G06Q 30/0253 |
| | | | | 705/14.51 |
| 2012/0290376 | A1* | 11/2012 | Dryer | G06Q 20/3278 |
| | | | | 705/14.23 |
| 2012/0296741 | A1* | 11/2012 | Dykes | G06Q 20/322 |
| | | | | 705/14.53 |
| 2014/0195425 | A1* | 7/2014 | Campos | G06Q 20/20 |
| | | | | 705/41 |

* cited by examiner

PAYMENT SYSTEM, PAYMENT TERMINAL, PAYMENT METHOD, PAYMENT PROGRAM, AND COMPUTER-READABLE RECORDING MEDIUM FOR RECORDING SAME PROGRAM

CROSS-REFERENCE TO RELATED APPLICATION

This is a continuation-in-part of application Ser. No. 14/007,888, filed Sep. 26, 2013, which was the National Stage of International Application No. PCT/JP2012/075413, claiming priority from Japanese Patent Application No. 2011-218434, filed Sep. 30, 2011, the contents of all of which are incorporated herein by reference in their entirety.

TECHNICAL FIELD

The present invention relates to a settlement system, a settlement terminal, a settlement method, a settlement program, and a computer-readable recording medium for recording same program.

BACKGROUND ART

A device capable of having a plurality of types of electronic money functions to be used for a settlement process is proposed. The IC chip in the mobile device disclosed in Patent Literature 1 is equipped with a plurality of applications for electronic money service providers (electronic money functions).

For example, when a payment process is made at a store, the mobile device is placed on an electronic money terminal located in the store, and the electronic money terminal sequentially inquires to the IC chip of the mobile device about whether the IC chip is equipped with the electronic money functions that are available in the electronic money terminal. Then, the electronic money terminal displays the electronic money types available in the electronic money terminal, which are found as a result of the inquiries, among the electronic money functions incorporated in the mobile device on a display device and allows a user of the mobile device to select one electronic money to use.

CITATION LIST

Patent Literature

PTL 1: Japanese Unexamined Patent Application Publication No. 2009-176065

SUMMARY OF INVENTION

Technical Problem

In the system disclosed in Patent Literature 1, the terminal having a function of sequentially making inquiries about acceptable electronic values inquires to the IC chip about the presence of each of the electronic value functions regardless of whether or not those electronic value functions are available in the IC chip. Further, because the system waits for a response for a specified period of time from sending an inquiry, the "specified period of time" results in the useless waiting time in the case where there is no response to the inquiry.

The problem to be solved by the present invention is to reduce the time required for inquiries by the settlement terminal having a function of sequentially making inquiries about acceptable electronic values.

Solution to Problem

A settlement system according to one aspect of the invention includes a payment terminal including a plurality of payment means each configured to perform a payment process and a settlement terminal including an inquiry means configured to sequentially inquire to the payment terminal about each of a plurality of acceptable payment means and accepting the payment process, performed by one payment means specified among payment means confirmed to be present by the inquiry means, by using a settlement means corresponding to the one payment means, wherein the payment terminal further includes a storage means configured to store limitation information contributing to limitation of acceptable payment means by the settlement terminal, and the settlement terminal further includes a limitation information acquisition means configured to acquire the limitation information stored in the storage means, and a stopping means configured to stop inquiries of the inquiry means when presence of payment means limited by the limitation information acquired by the limitation information acquisition means is confirmed by the inquiry means.

In the settlement system according to another aspect, the limitation information stored in the storage means may include the number of types of payment means usable for the payment process in the payment terminal, and the stopping means stops inquiries by the inquiry means when presence of the same number of payment means as indicated by the number of types included in the limitation information acquired by the limitation information acquisition means is confirmed by the inquiry means.

In the settlement system according to another aspect, the payment terminal may further includes a specifying information acquisition means configured to acquire specifying information corresponding to position information indicating a current position of the payment terminal acquired by a positioning means from a recording means configured to store specifying information specifying one or a plurality of payment means acceptable in the settlement terminal located near a position in association with position information indicating the position, and a means configured to store the number of overlaps between one or a plurality of payment means specified by the specifying information acquired by the specifying information acquisition means and payment means usable for the payment process in the payment terminal as the number of types into the storage means.

In the settlement system according to another aspect, the limitation information stored in the storage means may include identification information capable of identifying the payment means, and the stopping means may stop inquiries by the inquiry means when presence of all payment means identified by the identification information included in the limitation information acquired by the limitation information acquisition means is confirmed by the inquiry means.

In the settlement system according to another aspect, the limitation information stored in the storage means may include order information indicating priorities of the plurality of payment means, and the payment terminal may further include a specifying information acquisition means configured to acquire specifying information corresponding to position information indicating a current position of the payment terminal acquired by a positioning means from a specifying information storage means configured to store specifying information specifying one or a plurality of payment means acceptable in the settlement terminal located near a position in association with position information indicating the position, and a means configured to select one payment means with highest priority indicated by the order information stored in the storage means among one or a plurality of payment means specified by the specifying information acquired by the specifying information acquisition means and store identification information of the selected one payment means into the storage means.

In the settlement system according to another aspect, the payment terminal may further include a specifying information acquisition means configured to acquire specifying information corresponding to position information indicating a current position of the payment terminal acquired by a positioning means from a recording means configured to store specifying information specifying one or a plurality of payment means acceptable in the settlement terminal located near a position in association with position information indicating the position, and a means configured to store identification information of payment means overlapping between one or a plurality of payment means specified by the specifying information acquired by the specifying information acquisition means and payment means usable for the payment process in the payment terminal into the storage means.

A settlement terminal according to one aspect of the invention is a settlement terminal including an inquiry means configured to sequentially inquire to a payment terminal including a plurality of payment means each configured to perform a payment process about each of a plurality of acceptable payment means and accepting the payment process performed by one payment means, specified among payment means confirmed to be present by the inquiry means, by using a settlement means corresponding to the one payment means, the settlement terminal further including a limitation information acquisition means configured to acquire, from the payment terminal further including a storage means configured to store limitation information contributing to limitation of acceptable payment means by the settlement terminal, the limitation information stored in the storage means, and a stopping means configured to stop inquiries by the inquiry means when presence of payment means limited by the limitation information acquired by the limitation information acquisition means is confirmed by the inquiry means.

A settlement method according to one aspect of the invention is a settlement method executed by a settlement terminal including an inquiry means configured to sequentially inquire to a payment terminal including a plurality of payment means each configured to perform a payment process about each of a plurality of acceptable payment means and accepting the payment process performed by one payment means, specified among payment means confirmed to be present by the inquiry means, by using a settlement means corresponding to the one payment means, the method including a limitation information acquisition step of acquiring, from the payment terminal further including a storage means configured to store limitation information contributing to limitation of acceptable payment means by the settlement terminal, the limitation information stored in the storage means, and a stopping step of stopping inquiries by the inquiry means when presence of payment means limited by the limitation information acquired in the limitation information acquisition step is confirmed by the inquiry means.

A settlement program according to one aspect of the invention causes a settlement terminal including an inquiry means configured to sequentially inquire to a payment terminal including a plurality of payment means each configured to perform a payment process about each of a plurality of acceptable payment means and accepting the payment process performed by one payment means, specified among payment means confirmed to be present by the inquiry means, by using a settlement means corresponding to the one payment means to implement a limitation information acquisition function of acquiring, from the payment terminal further including a storage means configured to store limitation information contributing to limitation of acceptable payment means by the settlement means, the limitation information stored in the storage means, and a stopping function of stopping inquiries by the inquiry means when presence of payment means limited by the limitation information acquired by the limitation information acquisition function is confirmed by the inquiry means.

A computer-readable recording medium according to one aspect of the invention stores a settlement program causing a settlement terminal including an inquiry means configured to sequentially inquire to a payment terminal including a plurality of payment means each configured to perform a payment process about each of a plurality of acceptable payment means and accepting the payment process performed by one payment means, specified among payment means confirmed to be present by the inquiry means, by using a settlement means corresponding to the one payment means to implement a limitation information acquisition function of acquiring, from the payment terminal further including a storage means configured to store limitation information contributing to limitation of acceptable payment means by the settlement terminal, the limitation information stored in the storage means, and a stopping function of stopping inquiries by the inquiry means when presence of payment means limited by the limitation information acquired by the limitation information acquisition function is confirmed by the inquiry means.

Advantageous Effects of Invention

In the present invention, limitation information contributing to limitation of acceptable payment means is acquired in advance from a payment terminal, and inquiries are stopped at the point of time when the presence of payment means limited by the limitation information is confirmed.

Therefore, according to the present invention, the time required for inquiries by the settlement terminal having a function of sequentially making inquiries about acceptable electronic values is reduced.

DESCRIPTION OF EMBODIMENTS

Embodiments of the present invention are described hereinafter in detail with reference to the appended drawings. Note that, in the description of the drawings, the same or equivalent elements are denoted by the same reference symbols, and the redundant explanation thereof is omitted.

<1> First Embodiment

<1-1> Outline of Processing Procedure in Settlement System

Figure 1:
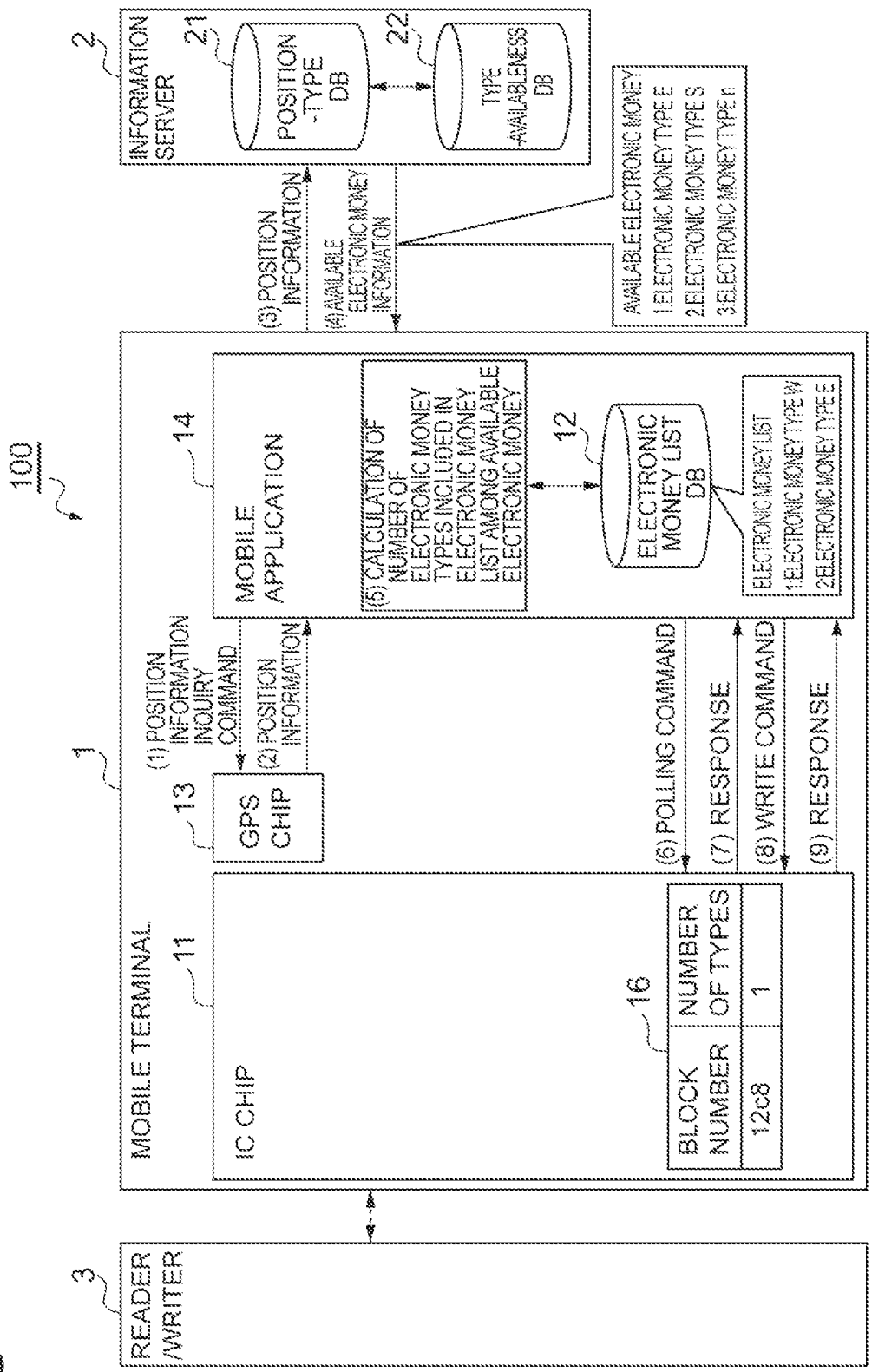
FIG. 1 is a procedure explanatory diagram illustrating the procedure of a preparation process performed prior to a settlement process in a settlement system according to a first embodiment.
Figure 2:
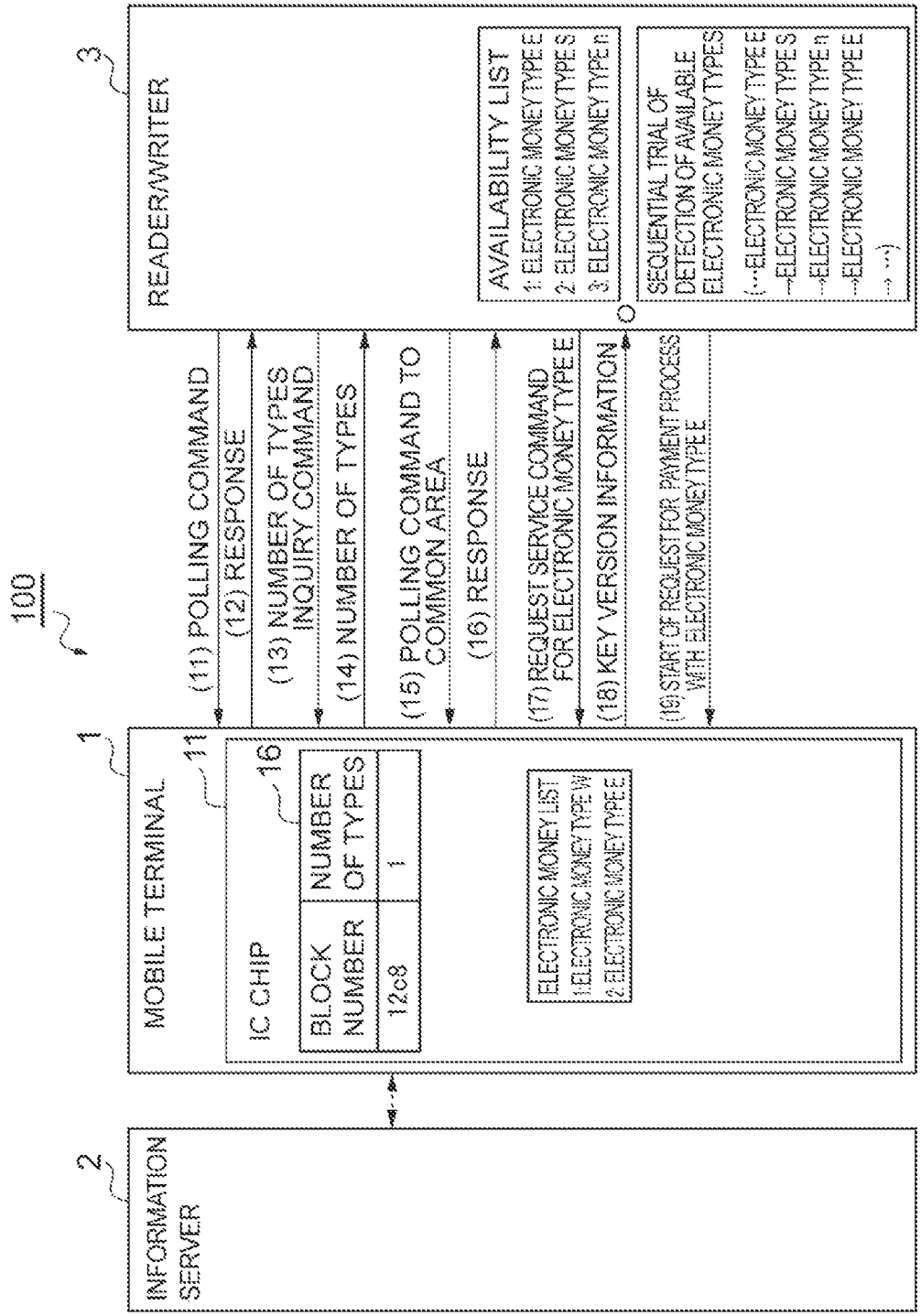
FIG. 2 is a procedure explanatory diagram illustrating a part of the procedure of the settlement process in the settlement system after the preparation process.

First, a settlement system according to a first embodiment is described with reference to FIGS. 1 and 2. FIG. 1 is a procedure explanatory diagram illustrating the procedure of a preparation process performed prior to a settlement process in the settlement system 100, and FIG. 2 is a procedure explanatory diagram illustrating a part of the procedure of the settlement process in the settlement system 100 after the preparation process.

The settlement system 100 is a system that includes a mobile terminal 1 (one example of a payment terminal), an information server 2, and a reader/writer 3 (one example of a settlement terminal). The mobile terminal 1 is a terminal that performs a payment process with an electronic payment function (prepaid stored-value electronic money function, postpaid stored-value electronic money function, prepaid center management electronic money function, credit function etc., any of which is an example of payment means; which are collectively referred to hereinafter as "electronic money", "electronic money type" and the like), such as a mobile phone terminal or a smartphone with electronic money functionality, for example. The information server 2 is a server device that includes a database that stores information required for a preparation process performed prior to the above-described payment process. The reader/writer 3 is a device that is placed in a POS (Point Of Sales) cash register or the like located in a store and the like and accepts a payment process by the mobile terminal 1, and it is connectable with an IC chip by near field communication.

Note that the mobile terminal 1 includes a contactless IC chip 11 (one example of the payment terminal), an electronic money list database 12, a GPS chip 13, and a mobile application 14 (an application program for the mobile terminal 1).

The IC chip 11 is an electronic module that includes a CPU (Central Processing Unit), ROM (Read Only Memory), RAM (Random Access Memory), EEPROM (Electrically Erasable Programmable Read Only Memory) and the like, and it is connectable with the reader/writer 3 by near field communication. Further, the IC chip 11 is connected with a CPU 101 of the mobile terminal 1 by wired.

Further, the IC chip 11 has a function of storing data and a function of executing a specified process in accordance with an externally input command and outputting a response in accordance with the command. For example, the payment process is implemented by the following methods (a) to (c).

(a) Store the balance of prepaid or postpaid electronic money into a predetermined storage area and read and output the balance in response to an externally input balance check command or change the balance in response to an externally input balance change command and output the processing result to thereby make payments with the value stored in the IC chip.

(b) Store the identifier (account ID) of a value account, which is a unit of managing values in the center, into a predetermined storage area and read and output the account ID in response to an externally input account ID check command to thereby make payments with the value stored in the center in association with the account ID.

(c) Store the user ID that identifies a user into a predetermined storage area and read and output the user ID in response to an externally input user ID check command to thereby make payments within the range of the credit limit set to the user ID for each specified period.

Further, the IC chip 11 includes a limitation information storage area 16, which is a data storage area to store limitation information that contributes to the limitation of payment means usable in the IC chip 11 among payment means acceptable in the reader/writer 3. The limitation information is information about payment means (electronic money type) usable in the mobile terminal 1 and usable in the settlement terminal. As described below, the limitation information is for reducing the number of inquiries about the usable electronic money types from the settlement terminal to the mobile terminal 1. In this embodiment, a control unit (a functional unit that is formed when an OS (Operating System) and an application program that runs on the OS are read by the CPU in the chip) of the IC chip 11 reads the limitation information from the limitation information storage area 16 and sends it back as a response when receiving a limitation information check command that specifies identification information (which is referred to hereinafter as "block number") for identifying the limitation information storage area 16.

The electronic money list database 12 is a database that stores a list of the types of electronic money (electronic money types) that are usable in the mobile terminal 1. The GPS chip 13 is an electronic module that measures the position of the mobile terminal 1. The mobile application 14 is an application program that performs a preparation process by accessing the IC chip 11.

Further, the information server 2 includes a position-type database 21 and a type-availableness database 22. The position-type database 21 is a database that stores position information indicating a position and a terminal type indicating the type of a settlement terminal located near the position in association with each other. The type-availableness database 22 is a database that stores a terminal type indicating the type of a settlement terminal and an electronic money type indicating the type of electronic money (payment means) acceptable in that type of settlement terminal in association with each other.

First, the procedure of a preparation process that is performed prior to a settlement process in the settlement system 100 is described with reference to FIG. 1. In the following, the case where a user of the mobile terminal 1 visits a store and eats and drinks, for example, and then performs the payment process with electronic money is described as one example. The mobile terminal 1 acquires settlement terminal specifying information as a preparation process of the settlement process. The settlement terminal specifying information, which is for specifying the settlement terminal, can be acquired by the mobile terminal 1.

First, when a user of the mobile terminal 1 enters a store, the user holds the mobile terminal 1 against a reader/writer for discount coupon issuance (not shown) or the like that is located at the entrance of the store, for example. Upon that act as a trigger, information about a discount coupon is displayed on the mobile terminal 1, and the mobile application 14 transmits a command to inquire about position information corresponding to the current position of the mobile terminal 1 to the GPS chip 13 (procedural step 1). Note that, instead of using the act that a user of the mobile terminal 1 holds the mobile terminal 1 against a reader/writer for discount coupon issuance or the like as a trigger, detection of identification information of an access point of a wireless LAN (so-called SSID) by the mobile terminal 1 may be used as a trigger, or the GPS chip 13 may perform positioning, which is described below, on a regular basis.

Next, the GPS chip 13 performs positioning and transmits position information indicating the current position of the mobile terminal 1 to the mobile application 14 (procedural step 2). That is, the mobile terminal 1 acquires the position information corresponding to the current position of the mobile terminal 1 as the settlement terminal specifying information. The position information is one example of the settlement terminal specifying information. Subsequently, the mobile application 14 transmits the position information to the information server 2 (procedural step 3). Then, the information server 2 inquires to the position-type database 21 about a terminal type corresponding to the received position information. Thereby, the settlement terminal can be specified. Further, the information server 2 inquires to the type-availableness database 22 about an electronic money type (available electronic money information as one example of specifying information) corresponding to the obtained terminal type. Then, the information server 2 transmits the obtained available electronic money information to the mobile terminal 1 (procedural step 4). It is assumed in this example that the available electronic money information specifies "electronic money type E", "electronic money type S" and "electronic money type n".

Then, the mobile application 14 refers to the electronic money list database 12 that has an electronic money list and specifies the number of electronic money types (the number of types as the limitation information) that are usable in the mobile terminal 1 among the electronic money types indicated by the received available electronic money information (procedural step 5). It is assumed in this example that the electronic money types that are usable in the mobile terminal 1 specify "electronic money type W" and "electronic money type E". Because only the "electronic money type E" matches between the available electronic money information and the electronic money list, the mobile application 14 specifies the number of electronic money types that are usable in the mobile terminal 1 among the received available electronic money as "1".

Then, the mobile application 14 sends a command (polling) for capturing the IC chip 11 (which does not designate a specific code) to the IC chip 11 (procedural step 6). In response thereto, the IC chip 11 sends a response containing unique ID information and the like back to the mobile application 14 (procedural step 7).

After that, it is assumed that a process in compliance with the technical specification and the management regulations of the IC card (for example, authentication etc.) is performed between the mobile application 14 and the IC chip 11, for example.

After that, the mobile application 14 sends a command (write) for writing the above-described number of types "1" to the limitation information storage area 16 (which is the location specified by the block number "12c8" in this example, and it is assumed that data can be written and read without need of key information; the same applies below) of the IC chip 11 to the IC chip 11 (procedural step 8). Then, the IC chip 11 sends a response indicating the success of writing of the number of types "1" to the designated area (the limitation information storage area 16 with the block number "12c8") back to the mobile application 14 (procedural step 9).

By the procedure shown in FIG. 1, the number of overlaps (which is one type: "electronic money type E" in the above example) between the electronic money types that are acceptable in a settlement terminal located near the current position of the mobile terminal 1 (which are three types: "electronic money type E", "electronic money type S" and "electronic money type n" in the above example) and the electronic money types that are usable in the mobile terminal 1 (which are two types: "electronic money type W" and "electronic money type E" in the above example) is specified, and the specified number of types (one example of limitation information) is written to the IC chip 11.

Incidentally, in the above-described example, the mobile application 14 of the mobile terminal 1 acquires the position information acquired by the GPS chip 13 as the settlement terminal specifying information, but the settlement terminal specifying information is not limited to this example.

For example, the settlement terminal specifying information may also be Beacon identification information acquired by Bluetooth communication. By acquiring such Beacon identification information, not only the position of the mobile terminal 1 but also, for example, a floor of a building where the mobile terminal 1 is present can be specified. The mobile application 14 of the mobile terminal 1 refers to a database that stores Beacon identification information and a settlement terminal in association with each other, and specifies the settlement terminal based on the acquired Beacon identification information. Then, the mobile application 14 refers to a database that stores a settlement terminal and an electronic money type acceptable in the settlement terminal in association with each other, and acquires information of the electronic money type that can be used on the floor based on the specified settlement terminal.

Also, the settlement terminal specifying information may be, for example, a sound wave (voice) acquired by a microphone installed in the mobile terminal 1. By acquiring the sound wave, not only the position of the mobile terminal 1 but also, for example, a floor of a building where the mobile terminal 1 is present can be specified. The mobile application 14 of the mobile terminal 1 refers to a database that stores information indicating a feature of a sound wave and a settlement terminal in association with each other, and specifies the settlement terminal based on the acquired sound wave. Then, the mobile application 14 refers to a database that stores a settlement terminal and an electronic money type acceptable in the settlement terminal in association with each other, and acquires information of the electronic money type that can be used on the floor based on the specified settlement terminal.

Further, the settlement terminal specifying information may be, for example, information included in a bar code acquired by a camera installed in the mobile terminal 1, information acquired by NFC (Near Field Communication) or information acquired by an optical sensor. By acquiring the information, a place where the mobile terminal 1 is present can be specified. The mobile application 14 of the mobile terminal 1 refers to a database that stores information or the like included in a bar code and a settlement terminal in association with each other, and specifies the settlement terminal based on the acquired information. Then, the mobile application 14 refers to a database that stores a settlement terminal and an electronic money type acceptable in the settlement terminal in association with each other, and acquires the information of the electronic money type that can be used at the place based on the specified settlement terminal.

Moreover, the settlement terminal specifying information may be, for example, an image of a store taken by a camera. By acquiring such an image of a store, the store in which the mobile terminal 1 is present can be specified. The mobile application 14 of the mobile terminal 1 refers to a database that stores an image of a store and a settlement terminal in association with each other, and specifies the settlement terminal based on the acquired image. Then, the mobile application 14 refers to a database that stores a settlement terminal and an electronic money type acceptable in the settlement terminal in association with each other, and acquires information of the electronic money type that can be used in the store based on the specified settlement terminal.

The procedure of the settlement process in the settlement system 100 is described hereinafter with reference to FIG. 2. In the following, the case where a user of the mobile terminal 1 has finished eating and drinking and performs the payment process with electronic money is described as one example.

The following description is based on the assumption that the reader/writer 3 repeats the trial cycle that inquires about electronic money types sequentially in the order of "electronic money type E", "electronic money type S" and "electronic money type n", for example.

FIG. 2 illustrates the settlement process that is performed based on the following assumptions. Those are just one example, and the procedure of the settlement process is designed in compliance with the technical specification and the management regulations of the IC card.

The area corresponding to the "electronic money type S" is specified by the first hierarchy code (system code). When there is a response to the polling command that designates the system code corresponding to the "electronic money type S", the presence of the "electronic money type S" is confirmed by the reader/writer 3.

The areas corresponding to the "electronic money type n", "electronic money type E" and "electronic money type W" are specified by the second hierarchy code (area code). When there is a response to the polling command that designates the system code of the area that includes the areas corresponding to those electronic money type and there is a specified response (for example, a response indicating a key version) to the request service command that designates the area code corresponding to one electronic money type, the presence of the one electronic money type is confirmed by the reader/writer 3.

First, a user of the mobile terminal 1 holds the mobile terminal 1 against the reader/writer 3 for the settlement process. Upon that act as a trigger, the reader/writer 3 sends a command (polling) for capturing the IC chip 11 (which does not designate a specific code) (procedural step 11). In response thereto, the IC chip 11 sends a response containing unique ID information and the like back to the reader/writer 3 (procedural step 12).

Then, the reader/writer 3 sends an inquiry command (read) for making an inquiry about the number of types stored in the limitation information storage area 16 to the IC chip 11 (procedural step 13). In response thereto, the IC chip 11 sends a response indicating that the number of types is "1" back to the reader/writer 3 (procedural step 14).

Then, the reader/writer 3 sends a command (polling) for making an inquiry about the presence of the area (which is referred to as the common area) that includes the area corresponding to the "electronic money type E" which is at the top of the availability list to the IC chip 11 (procedural step 15). In response thereto, the IC chip 11 sends a response indicating the presence of the common area back to the reader/writer 3 (procedural step 16).

Then, the reader/writer 3 sends a command (request service) designating the code corresponding to the "electronic money type E" to the IC chip 11 (procedural step 17). In response thereto, the IC chip 11 sends key version information indicating that there is a service corresponding to the designated code back to the reader/writer 3 (procedural step 18).

By the procedure shown in FIG. 2, because the number of electronic money types confirmed to be usable ("electronic money type E"), which is "1", and the number of types stored in the limitation information storage area 16, which is "1", are the same, the reader/writer 3 stops the processing of making inquiries about whether another electronic money type is usable in the IC chip 11 and starts a request for the payment process with the "electronic money type E" that turns out to be usable to the IC chip 11 (procedural step 19). The settlement process is thereby performed between the mobile terminal 1 and the reader/writer 3.

Note that, when the number of types is plural, the processing of making inquiries to the IC chip 11 is repeated until the presence of the same number of electronic money types as the number indicated by that number of types is confirmed. Incidentally, in the above-described example, the number of overlaps between the electronic money types acceptable in the settlement terminals located near the current position of the mobile terminal 1 and the electronic money types usable in the mobile terminal 1 is written to the IC chip 11 as the limitation information, but the limitation information is not limited to the number of the overlaps of the electronic money types. For example, identification information of the overlapped electronic money types between the electronic money types acceptable in the settlement terminals and the electronic money types usable in the mobile terminal 1 may be written to the limitation information storage area 16 of the IC chip 11 as the limitation information. In this case, the reader/writer 3 receives the identification information of the electronic money types as a response about the inquiry of the limitation information (procedural step 13) (procedural step 14). The reader/writer 3 makes a process to inquire to the IC chip 11 whether the electronic money types can be used or not, and stops the inquiry process in the case of confirming that all of the electronic money types shown in the identification information which is received as the limitation information can be used.

<1-2> Configuration of Settlement System

Figure 3:
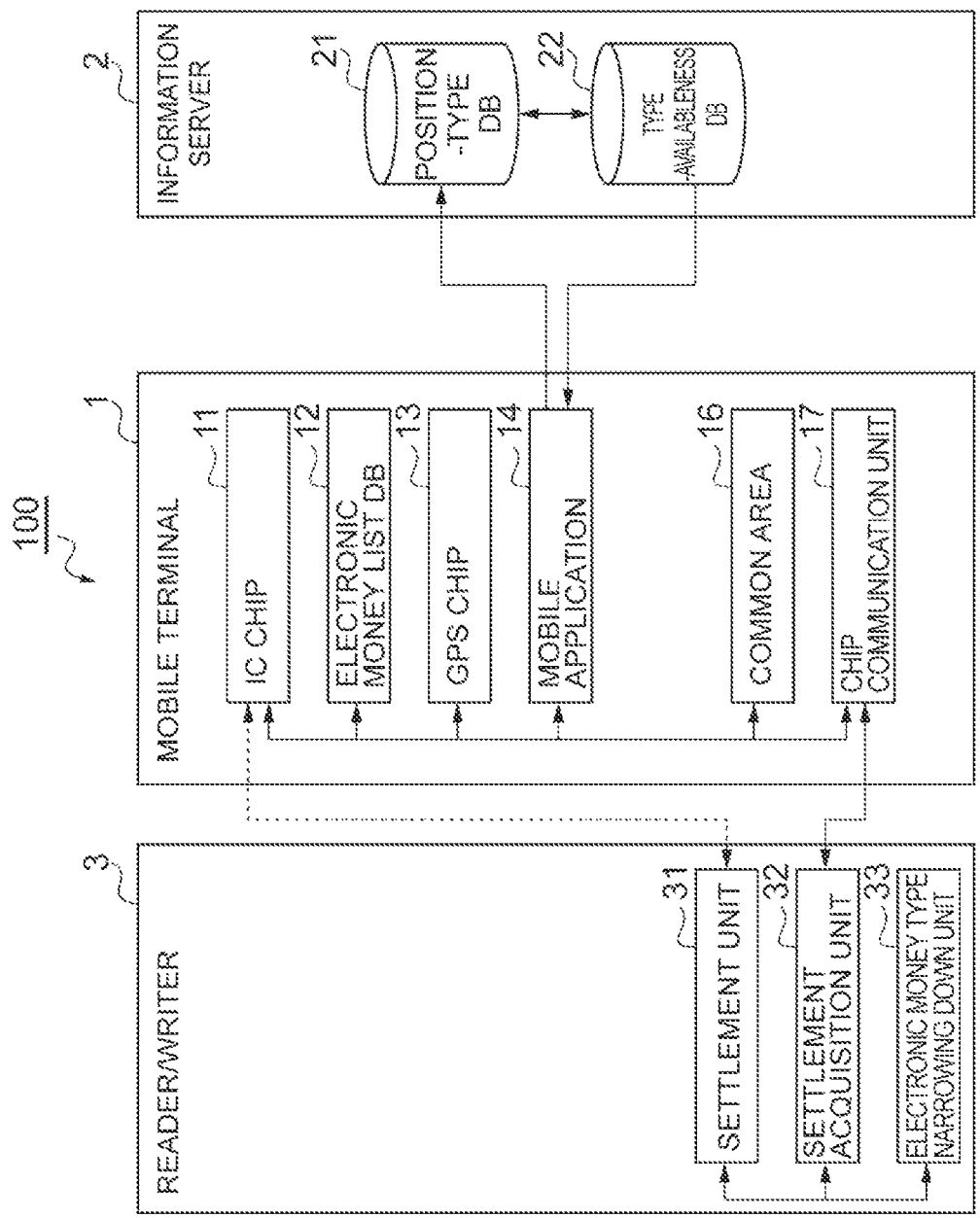
FIG. 3 is a block diagram illustrating the configuration of the settlement system.

The configuration of the settlement system 100 is described hereinafter with reference to FIGS. 3 to 5. FIG. 3 is a block diagram illustrating the configuration of the settlement system 100, FIG. 4 is a block diagram showing the physical configuration of the mobile terminal 1 included in the settlement system 100 (and a mobile terminal 4 included in the settlement system 200, which is described later), and FIG. 5 is a block diagram showing the physical configurations of the information server 2 and the reader/writer 3 included in the settlement system 100 (and an information server 5 and a reader/writer 6 included in the settlement system 200, which are described later).

Figure 4:
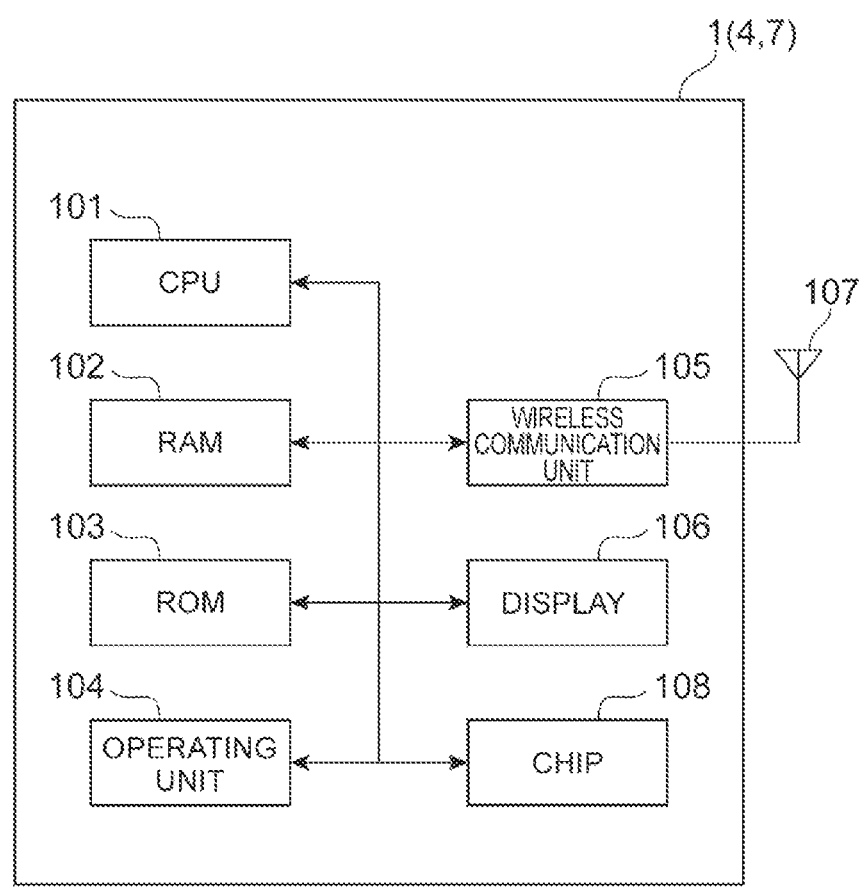
FIG. 4 is a block diagram showing the physical configuration of a mobile terminal included in the settlement system.
Figure 5:
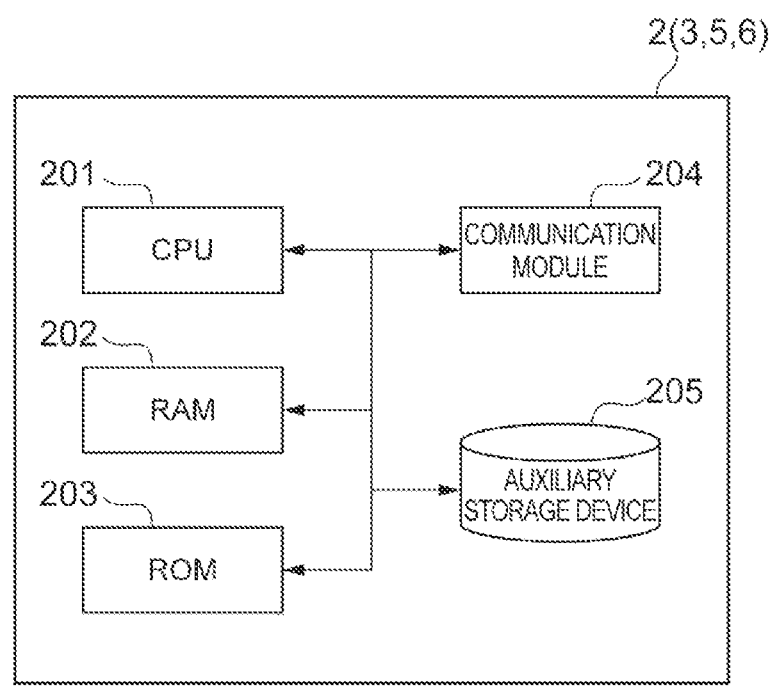
FIG. 5 is a block diagram showing the physical configuration of a reader/writer included in the settlement system.

As shown in FIG. 4, the mobile terminal 1 is a small computer terminal that is composed of hardware such as a CPU 101 (Central Processing Unit), a RAM 102 (Random Access Memory), a ROM 103 (Read Only Memory), an operating unit 104, a wireless communication unit 105, a display 106, an antenna 107, and various chips 108 as principal physical components. Those components operate so that the functions of the mobile terminal 1 are exerted.

As shown in FIG. 3, the mobile terminal 1 is composed of the IC chip 11, the electronic money list database 12, the GPS chip 13, the mobile application 14, a computing unit 15, and a chip communication unit 17 as principal functional components.

The IC chip 11 is a semiconductor integrated circuit unit that is capable of performing the payment process with a plurality of electronic money types. The plurality of electronic money types include "electronic money type E", "electronic money type W" and "electronic money type n", for example.

The electronic money list database 12 is a database unit that stores a list of electronic money that can be used for the payment process in the IC chip 11 of the mobile terminal 1.

The GPS chip 13 is a positioning unit that acquires position information corresponding to the current position of the mobile terminal 1 by using GPS (Global Positioning System).

The mobile application 14 is an application unit that transmits the position information acquired by the GPS chip 13 to the information server 2 to inquire about available electronic money information corresponding to the position information and thereby acquires the available electronic money information.

Further, the mobile application 14 specifies the number of overlaps between the electronic money types acceptable in the reader/writer 3 and the electronic money types usable in the IC chip 11 and writes it to the limitation information storage area 16.

The chip communication unit 17 is a communication unit that controls near field communication that is performed with the reader/writer 3.

As shown in FIG. 5, the information server 2 and the reader/writer 3 are configured as computers that include hardware such as a CPU 201 (Central Processing Unit), a RAM 202 (Random Access Memory) and a ROM 203 (Read Only Memory) serving as main storage devices, a communication module 204 for performing communication, and an auxiliary storage device 205 such as hard disk as principal physical components. Those components operate so that the functions of the information server 2 and the reader/writer 3 are exerted.

As shown in FIG. 3, the information server 2 is composed of the position-type database 21 and the type-availableness database 22 as principal functional components.

As shown in FIG. 3, the reader/writer 3 is composed of a settlement unit 31 (settlement means), a settlement acquisition unit 32 (inquiry means), and an electronic money type narrowing down unit 33 (limitation information acquisition means and stopping means) as principal functional components.

The settlement unit 31 is an electronic module that is capable of accepting the payment process with a plurality of electronic money types by the IC chip 11 using the corresponding settlement function (settlement means). The settlement unit 31 holds an encryption key that is required for cipher communication performed with the IC chip 11 for each of the electronic money types. Further, the settlement unit 31 has a function of generating a command for changing the balance of electronic money, a function of generating log data indicating the history of settlement process made with the IC chip, a function of transmitting the log data to a corresponding electronic money server (not shown) at predetermined timing and the like.

The settlement acquisition unit 32 inquires sequentially to the IC chip 11 and thereby specifies the electronic money types that are usable for the payment process in the IC chip 11 among the electronic money types that are acceptable in the settlement unit 31.

The electronic money type narrowing down unit 33 acquires the number of types (limitation information) from the limitation information storage area 16 of the IC chip 11 and, when the presence of the number of electronic money types corresponding to the acquired number of types is confirmed by the settlement acquisition unit 32, causes the settlement acquisition unit 32 to stop making inquiries. Then, when the number of types is "1", the electronic money type narrowing down unit 33 causes the settlement unit 31 to immediately start the settlement process using the settlement function corresponding to the electronic money type that is confirmed to be present by the settlement acquisition unit 32. On the other hand, when the number of types is plural, the electronic money type narrowing down unit 33 displays the electronic money types that are confirmed to be present by the settlement acquisition unit 32 on a display or the like and lets a user select any one of them, and causes the settlement unit 31 to start the settlement process using the settlement function corresponding to the selected electronic money type.

<1-3> Flow of Process in Settlement System

Figure 6:
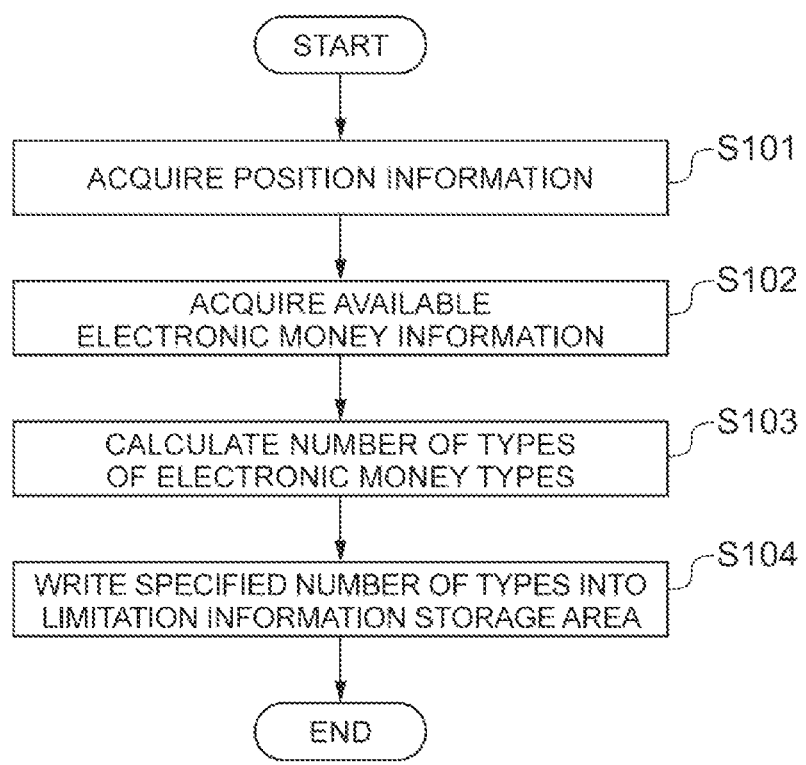
FIG. 6 is a flowchart showing the flow of the preparation process performed prior to the settlement process in the settlement system.
Figure 7:
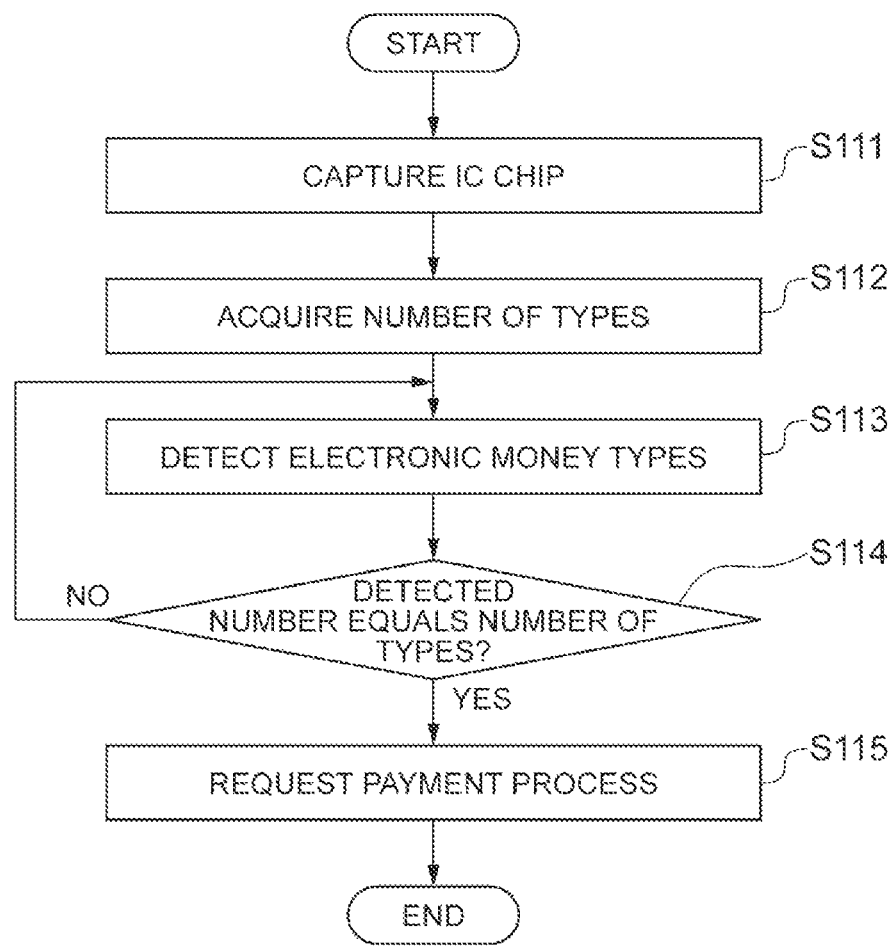
FIG. 7 is a flowchart showing a part of the flow of the settlement process in the settlement system after the preparation process.

The flow of the process (settlement method) executed in the settlement system 100 is described hereinafter with reference to FIGS. 6 and 7. FIG. 6 is a flowchart showing the flow of the preparation process performed prior to the settlement process in the settlement system 100, and FIG. 7 is a flowchart showing a part of the flow of the settlement process in the settlement system 100 after the preparation process.

First, the flow of the preparation process performed prior to the settlement process in the settlement system 100 is described hereinafter with reference to FIG. 6. In the following, the case where a user of the mobile terminal 1 visits a store and eats and drinks, for example, and then performs the payment process with electronic money is described as one example.

First, when a user of the mobile terminal 1 enters a store, the user holds the mobile terminal 1 against a reader/writer for discount coupon issuance (not shown) or the like that is located at the entrance of the store, for example. Upon that act as a trigger, information about a discount coupon is displayed on the mobile terminal 1, and the mobile terminal 1 performs positioning, thereby acquires position information indicating the current position of the mobile terminal 1, and transmits it to the information server 2 (Step S101).

Then, the information server 2 inquires to the position-type database 21 about a terminal type corresponding to the received position information and further inquires to the type-availableness database 22 about an electronic money type (available electronic money information as one example of specifying information) corresponding to the obtained terminal type and thereby acquires and transmits the obtained available electronic money information to the mobile terminal 1 (Step S102).

Then, the mobile terminal 1 acquires the number of electronic money types (the number of types as the limitation information) that are usable in the mobile terminal 1 among the electronic money types indicated by the received available electronic money information by making an inquiry to the electronic money list database 12 (Step S103). The mobile terminal 1 then writes the specified number of types to the limitation information storage area 16 (Step S104).

By the procedure shown in FIG. 6, the number of overlaps between the electronic money types that are acceptable in the settlement terminal located near the current position of the mobile terminal 1 and the electronic money types that are usable in the mobile terminal is written to the limitation information storage area 16 of the IC chip 11.

A part of the flow of the settlement process in the settlement system 100 after the preparation process is described hereinafter with reference to FIG. 7.

First, a user of the mobile terminal 1 holds the mobile terminal 1 against the reader/writer 3 for the settlement process. Upon that act as a trigger, the reader/writer 3 captures and specifies the IC chip 11 (Step S111).

Next, the reader/writer 3 acquires the number of types stored in the limitation information storage area 16 from the IC chip 11 (Step S112).

Then, the reader/writer 3 sequentially inquires to the IC chip 11 about whether the acceptable electronic money types are usable for the payment process in the IC chip 11 until the presence of the number of electronic money types corresponding to the number of types acquired from the IC chip 11 is confirmed (Step S113, Step S114).

In the case where the detected number of electronic money types confirmed to be usable for the payment process and the above-described number of types are the same, the reader/writer 3 stops the processing of detecting whether another electronic money type is usable. Then, the reader/writer 3 starts a request for the payment process with the electronic money type that turns out to be usable for the payment process in the IC chip 11 by the above-described inquiry process (Step S115). The settlement process is thereby performed between the IC chip 11 and the reader/writer 3.

Note that, when the number of types is plural, after the presence of the number of electronic money types corresponding to that number of types is confirmed, the confirmed electronic money types may be displayed on a display (not shown) to allow a user to select the electronic money type to be used for the payment process. In this case also, the processing of sequentially making inquires about the electronic money types is stopped at the point of time when the presence of the number of electronic money types corresponding to the number of types is confirmed, thereby reducing the time required to confirm the electronic money type.

<1-4> Settlement Program and Payment Program

A settlement program and a payment program for causing computers to function as the reader/writer 3 and the mobile terminal 1, respectively, are provided in the form of being recorded in a static manner on a recording medium such as CD-ROM, DVD-ROM or semiconductor memory, for example. Further, the settlement program and the payment program may be provided as computer data signals superimposed onto carrier waves through a communication network.

<2> Second Embodiment

<2-1> Outline of Processing Procedure in Settlement System

Figure 8:
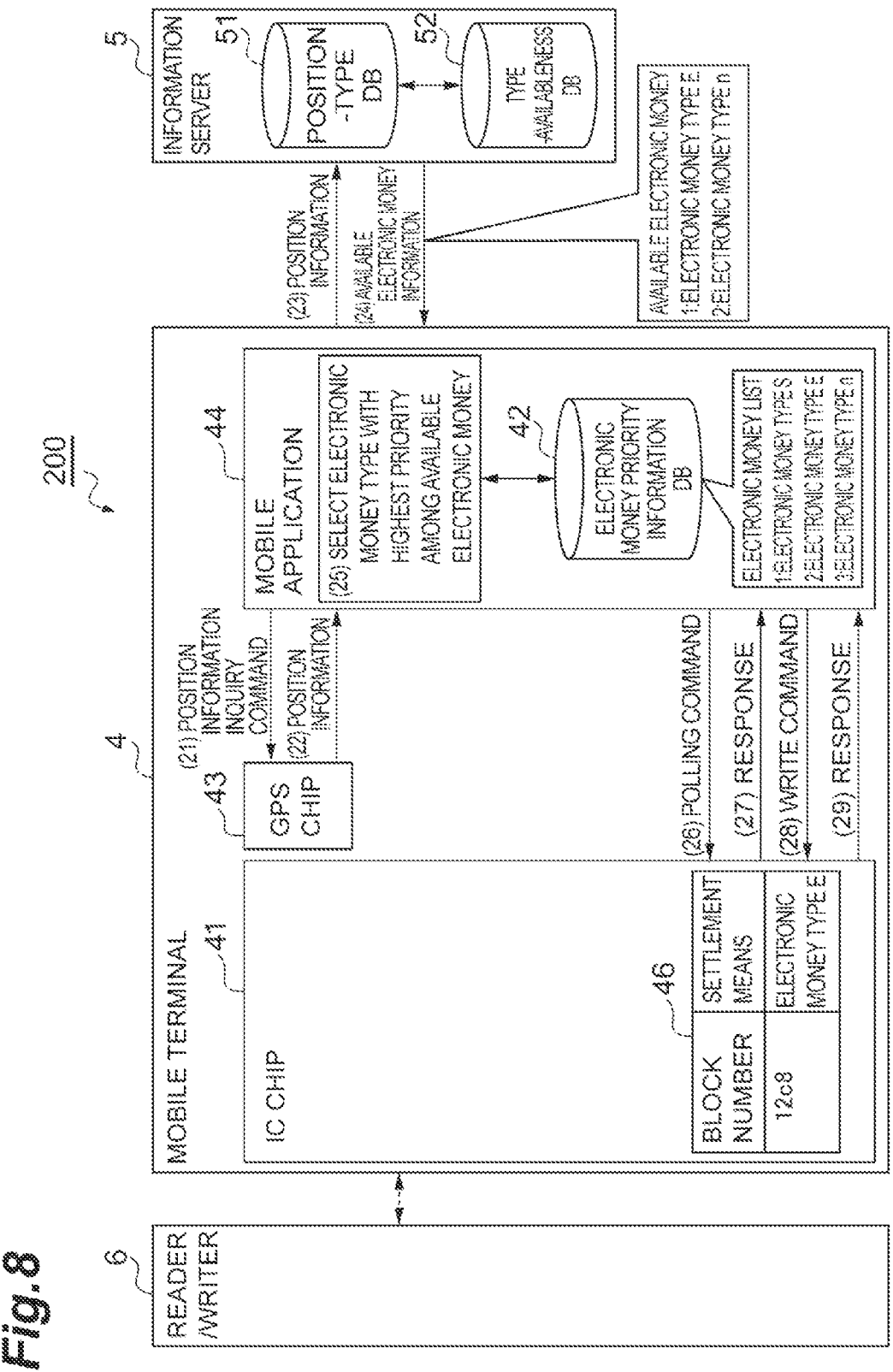
FIG. 8 is a procedure explanatory diagram illustrating the procedure of a preparation process performed prior to a settlement process in a settlement system according to a second embodiment.
Figure 9:
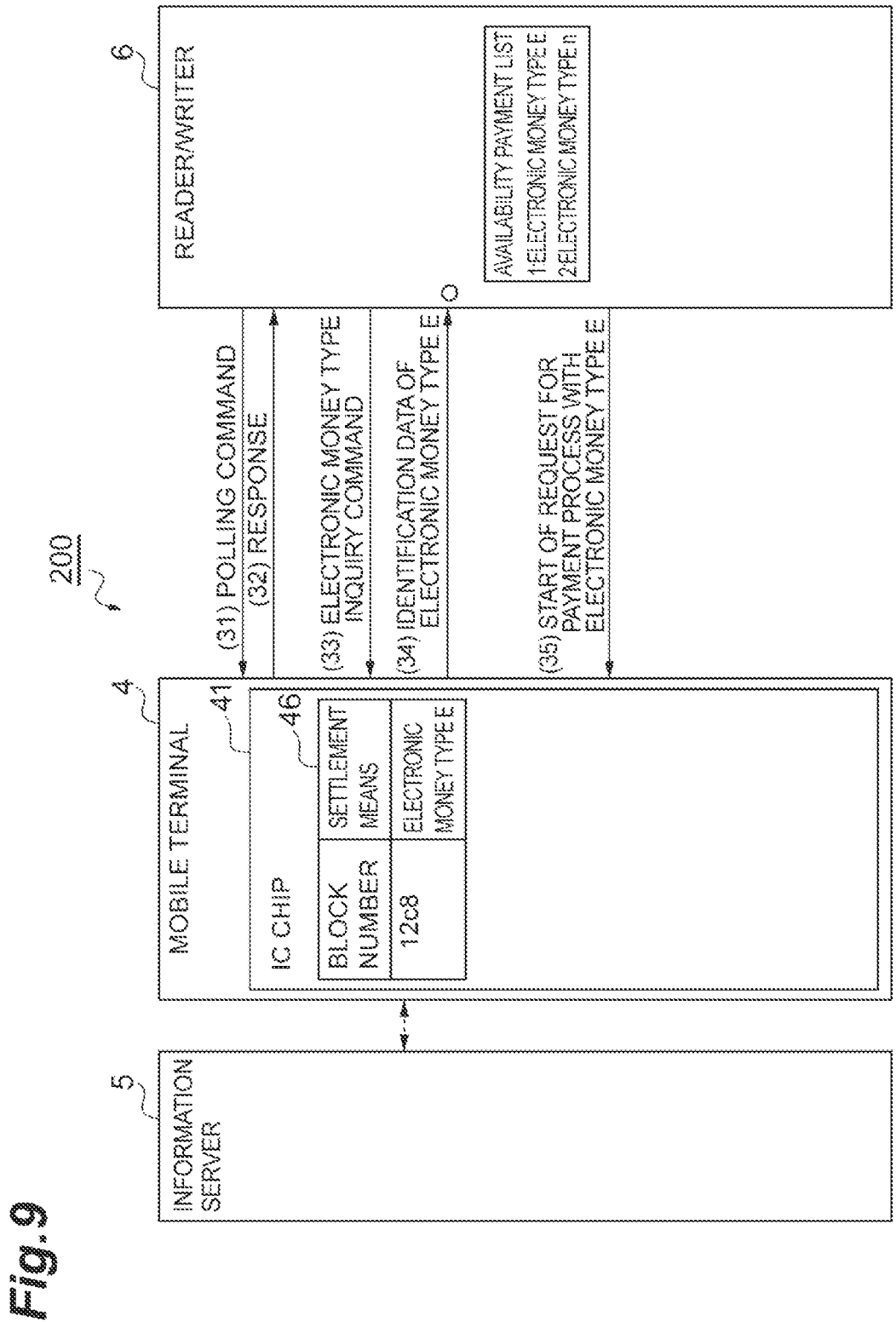
FIG. 9 is a procedure explanatory diagram illustrating the procedure of the settlement process in the settlement system after the preparation process.

A settlement system according to a second embodiment is described hereinafter with reference to FIGS. 8 and 9. FIG. 8 is a procedure explanatory diagram illustrating the procedure of a preparation process performed prior to a settlement process in the settlement system 200, and FIG. 9 is a procedure explanatory diagram illustrating a part of the procedure of the settlement process in the settlement system 200 after the preparation process.

The settlement system 200 is a system that includes a mobile terminal 4 (one example of a payment terminal), an information server 5, and a reader/writer 6 (one example of a settlement terminal). The mobile terminal 4 is a terminal that performs a payment process with an electronic payment function (prepaid stored-value electronic money function, postpaid stored-value electronic money function, prepaid center management electronic money function, credit function etc., any of which is an example of payment means; which are collectively referred to hereinafter as "electronic money", "electronic money type" and the like), such as a mobile phone terminal or a smartphone with electronic money functionality, for example. The information server 2 is a server device that includes a database that stores information required for a preparation process performed prior to the above-described payment process. The reader/writer 3 is a device that is placed in a POS (Point Of Sales) cash register or the like located in a store and the like and accepts the payment process by the mobile terminal 1, and it is connectable with an IC chip by near field communication.

Note that the mobile terminal 4 includes a contactless IC chip 41 (one example of a payment terminal), an electronic money priority information database 42, a GPS chip 43, and a mobile application 44 (an application program for the mobile terminal 4).

The IC chip 41 is an electronic module that includes a CPU (Central Processing Unit), ROM (Read Only Memory), RAM (Random Access Memory), EEPROM (Electrically Erasable Programmable Read Only Memory) and the like, and it is connectable with the reader/writer 3 by near field communication. Further, the IC chip 41 is connected with a CPU of the mobile terminal 4 by wired. Note that the functions of the IC chip 41 are the same as the functions of the IC chip 11 except for those explicitly described below.

The electronic money priority information database 42 is a database that stores information about the priorities at the selection of the types of electronic money (electronic money types) that are usable in the mobile terminal 4. The GPS chip 43 is an electronic module that measures the position of the mobile terminal 4. The mobile application 44 is an application program that has a function of performing a preparation process by accessing the IC chip 41.

Further, the information server 5 includes a position-type database 51 and a type-availableness database 52. The position-type database 51 is a database that stores position information indicating a position and a terminal type indicating the type of a settlement terminal located near the position in association with each other. The type-availableness database 52 is a database that stores a terminal type indicating the type of a settlement terminal and the type of electronic money (payment means) acceptable in that type of the settlement terminal in association with each other.

First, the procedure of a preparation process that is performed prior to a settlement process in the settlement system 200 is described with reference to FIG. 8. In the following, the case where a user of the mobile terminal 4 visits a store and eats and drinks, for example, and then performs the payment process with electronic money is described as one example.

First, when a user of the mobile terminal 4 enters a store, the user holds the mobile terminal 4 against a reader/writer for discount coupon issuance (not shown) or the like that is located at the entrance of the store, for example. Upon that act as a trigger, information about a discount coupon is displayed on the mobile terminal 4, and the mobile application 44 transmits a command to inquire about position information corresponding to the current position of the mobile terminal 4 to the GPS chip 103 (procedural step 21). Note that, instead of using the act that a user of the mobile terminal 4 holds the mobile terminal 4 against a reader/writer for discount coupon issuance or the like as a trigger, detection of SSID by the mobile terminal 1 may be used as a trigger, or the GPS chip 43 may perform positioning, which is described below, on a regular basis.

Next, the GPS chip 43 performs positioning and transmits position information indicating the current position of the mobile terminal 4 to the mobile application 44 (procedural step 22), and the mobile application 44 transmits the position information to the information server 5 (procedural step 23). Then, the information server 5 inquires to the position-type database 51 about a terminal type corresponding to the received position information and further inquires to the type-availableness database 52 about an electronic money type (available electronic money information as one example of specifying information) corresponding to the obtained terminal type. Then, the information server 5 transmits the obtained available electronic money information to the mobile terminal 4 (procedural step 24). It is assumed in this example that the available electronic money information specifies "electronic money type E" and "electronic money type n".

Then, the mobile application 44 refers to the electronic money priority information database 42 that has electronic money type priority information and selects the electronic money type with the highest priority in the mobile terminal 4 among the electronic money types indicated by the received available electronic money information (procedural step 25). It is assumed in this example that the priority indicated by the electronic money type priority information is "electronic money type S" "electronic money type E" and "electronic money type n" from the highest to the lowest. Because the one with the highest priority in the electronic money type priority information among the available electronic money information is the "electronic money type E", the mobile application 44 selects the "electronic money type E" as the electronic money type that is usable in the mobile terminal 4 among the received available electronic money.

Then, the mobile application 44 sends a command (polling) for capturing the IC chip 41 (which does not designate a specific code) to the IC chip 41 (procedural step 26). In response thereto, the IC chip 41 sends a response containing unique ID information and the like back to the mobile application 44 (procedural step 27).

After that, it is assumed that a process in compliance with the technical specification and the management regulations of the IC card (for example, authentication etc.) is performed between the mobile application 44 and the IC chip 41, for example.

After that, the mobile application 44 sends a command (write) for writing identification data of the "electronic money type E", which is the above-described usable electronic money type, to the limitation information storage area 46 (which is the location specified by the block number "12*c*8" in this example, and it is assumed that data can be written and read without need of key information; the same applies below) of the IC chip 41 to the IC chip 41 (procedural step 28). Then, the IC chip 41 sends a response indicating the success of writing of the identification data of the "electronic money type E" to the designated area (the limitation information storage area 46 with the block number "12*c*8") back to the mobile application 44 (procedural step 29).

By the procedure shown in FIG. 8, the electronic money type with the highest priority (which is the "electronic money type E" in the above example) out of the electronic money types that are usable in the mobile terminal 4 (which are two types: "electronic money type S", "electronic money type E" and "electronic money type n" in the above example) among the electronic money types that are acceptable in the settlement terminal located near the current position of the mobile terminal 4 (which are two types: "electronic money type E" and "electronic money type n" in the above example) is selected, and identification data (one example of limitation information) of the selected electronic money type is written to the IC chip 41.

The procedure of the settlement process in the settlement system 200 is described hereinafter with reference to FIG. 10. In the following, the case where a user of the mobile terminal 4 has finished eating and drinking and performs the payment process with electronic money is described as one example.

The following description is based on the assumption that the reader/writer 3 repeats the trial cycle that inquires about electronic money types sequentially in the order of "electronic money type E" and "electronic money type n", for example.

First, a user of the mobile terminal 4 holds the mobile terminal 4 against the reader/writer 6 for the settlement process. Upon that act as a trigger, the reader/writer 6 sends a command (polling) for capturing the IC chip 41 (which does not designate a specific code) (procedural step 31). In response thereto, the IC chip 41 sends a response containing unique ID information and the like back to the reader/writer 6 (procedural step 32).

Then, the reader/writer 6 sends an inquiry command (read) for making an inquiry about identification data of the settlement means (electronic money types) stored in the limitation information storage area 46 to the IC chip 41 (procedural step 33). In response thereto, the IC chip 41 sends identification data of the electronic money type ("electronic money type E" in this example (in this embodiment, it is an identification code that specifies an area including an area corresponding to the electronic money type, such as a system code or area code)) stored in the limitation information storage area 46 back to the reader/writer 6 (procedural step 34).

By the procedure shown in FIG. 9, because one electronic money type with the highest priority in the mobile terminal 4 among the electronic money types that are acceptable in the reader/writer 6 and that are usable for the payment process in the mobile terminal 4 (IC chip 41) is specified, and the reader/writer 6 starts a request for the payment process with the specified electronic money type (which is the "electronic money type E" in the above example) to the IC chip 41 (procedural step 35). The settlement process is thereby performed between the mobile terminal 4 and the reader/writer 6.

Note that, in the case where a plurality of identification data are stored in the limitation information storage area 46 (which is the case where all of identification data of electronic money types that are acceptable in the reader/writer 6 and further usable for the payment process in the mobile terminal 4 (IC chip 41) are stored in the limitation information storage area 46), it is preferred that, after a plurality of electronic money types respectively indicated by the plurality of identification data are specified, a list of the specified electronic money types is output to a display (not shown) or the like to let a user select one electronic money type, and the reader/writer 6 starts a request for the payment process with the selected electronic money type to the IC chip 41.

<2-2> Configuration of Settlement System

The configuration of the settlement system 200 is described hereinafter with reference to FIGS. 4, 5 and 10. FIG. 10 is a block diagram illustrating the configuration of the settlement system 200.

As shown in FIG. 4, the mobile terminal 4 is a small computer terminal that is composed of hardware such as a CPU 101 (Central Processing Unit), a RAM 102 (Random Access Memory), a ROM 103 (Read Only Memory), an operating unit 104, a wireless communication unit 105, a display 106, an antenna 107, and various chips 108 as principal physical components. Those components operate so that the functions of the mobile terminal 4 are exerted.

Figure 10:
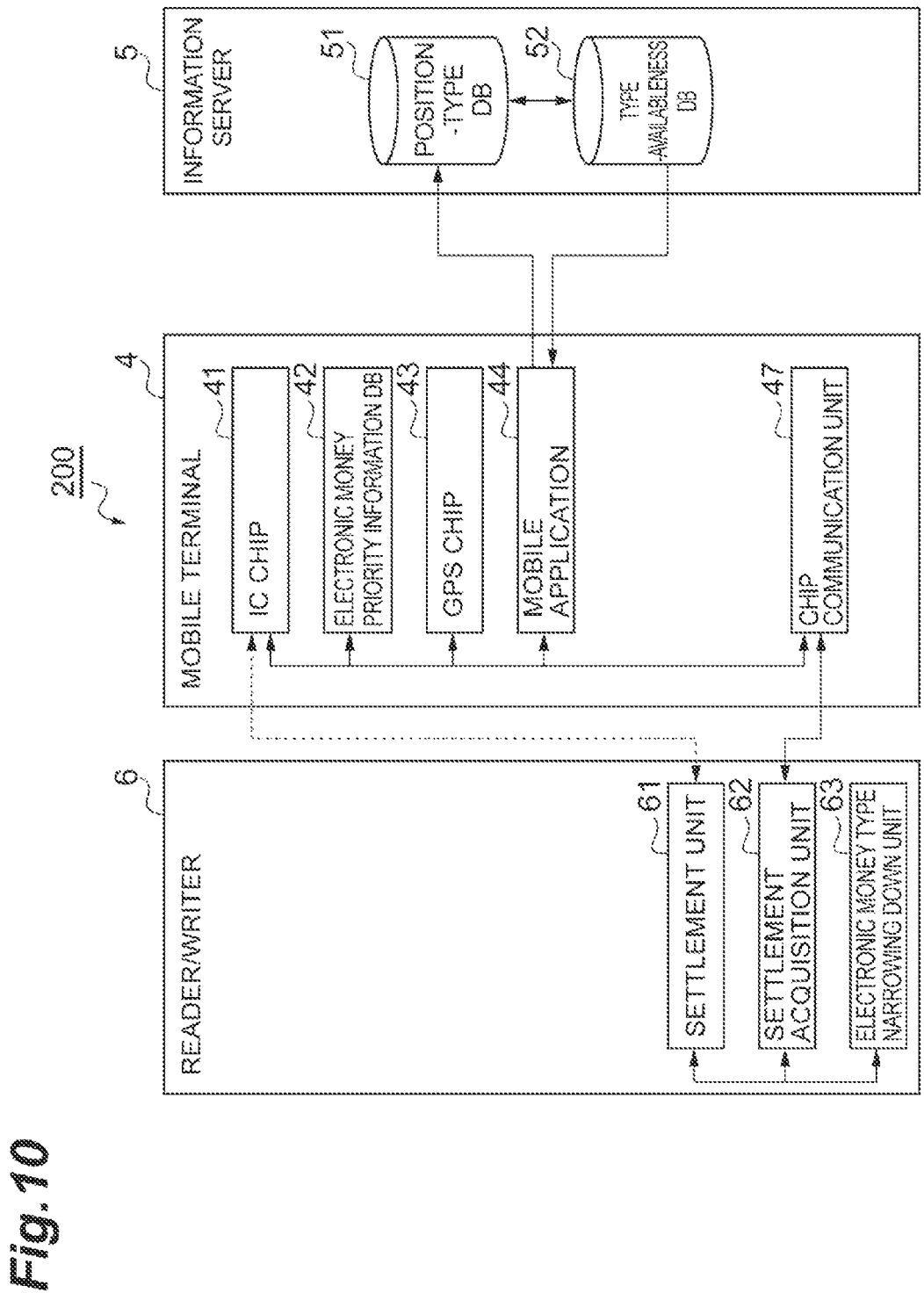
FIG. 10 is a block diagram illustrating the configuration of the settlement system.

As shown in FIG. 10, the mobile terminal 4 is composed of the IC chip 41, the electronic money priority information database 42, the GPS chip 43, the mobile application 44, and a chip communication unit 47 as principal functional components.

The IC chip 41 is a semiconductor integrated circuit unit that is capable of performing the payment process with a plurality of electronic money types. The plurality of electronic money types include "electronic money type E", "electronic money type W" and "electronic money type n", for example.

The electronic money priority information database 42 is a database unit that stores electronic money priority information indicating the priorities in the mobile terminal 4 of a plurality of types of electronic money (electronic money types) that are usable in the mobile terminal 4. The electronic money priority information that specifies the priority at the selection may be set to be registered in advance by a user, may be set to be registered automatically so that the higher priority is given to the electronic money type having the higher frequency of use, or may be set to be registered automatically so that the higher priority is given to the electronic money type with the higher balance (value balance) of electronic money.

The GPS chip 43 is a positioning unit that acquires position information corresponding to the current position of the mobile terminal 4 by using GPS (Global Positioning System).

The mobile application 44 is an application unit that transmits the position information acquired by the GPS chip 43 to the information server 5 to inquire about available electronic money information corresponding to the position information and thereby acquires the available electronic money information.

Further, the mobile application 44 specifies a predetermined number of electronic money types sequentially in descending order of priority out of the electronic money types that are usable in the IC chip 11 among the electronic money types that are acceptable in the reader/writer 3, and writes the identification data of the specified electronic money types to the limitation information storage area 46 of the IC chip.

The chip communication unit 47 is a communication unit that controls near field communication that is performed with the reader/writer 6.

As shown in FIG. 5, the information server 5 and the reader/writer 6 are configured as computers that include hardware such as a CPU 201 (Central Processing Unit), a RAM 202 (Random Access Memory) and a ROM 203 (Read Only Memory) serving as main storage devices, a communication module 204 for performing communication, and an auxiliary storage device 205 such as hard disk as principal physical components. Those components operate so that the functions of the information server 5 and the reader/writer 6 are exerted.

As shown in FIG. 10, the information server 5 is composed of the position-type database 51 and the type-availableness database 52 as principal functional components.

As shown in FIG. 10, the reader/writer 6 is composed of a settlement unit 61 (settlement means), a settlement acquisition unit 62 (inquiry means), and an electronic money type narrowing down unit 63 (limitation information acquisition means and stopping means) as principal functional components.

The settlement unit 61 is an electronic module that is capable of accepting the payment process with a plurality of electronic money types by the IC chip 41 using the corresponding settlement function (settlement means). The settlement unit 61 holds an encryption key that is required for cipher communication performed with the IC chip 41 for each of the electronic money types. Further, the settlement unit 61 has a function of generating a command for changing the balance of electronic money, a function of generating log data indicating the history of settlement process made with the IC chip, a function of transmitting the log data to a corresponding electronic money server (not shown) at predetermined timing and the like.

The settlement acquisition unit 62 inquires sequentially to the IC chip 41 and thereby specifies the electronic money types that are usable for the payment process in the IC chip 41 among the electronic money types that are acceptable in the settlement unit 61.

The electronic money type narrowing down unit 63 acquires the identification data of the electronic money type (limitation information) from the limitation information storage area 16 of the IC chip 11 and, when the presence of the electronic money type corresponding to the acquired identification data is confirmed by the settlement acquisition unit 62, causes the settlement acquisition unit 62 to stop making inquiries.

Then, when the identification data stored in the limitation information storage area 46 is any one type, the electronic money type narrowing down unit 63 causes the settlement unit 61 to immediately start the settlement process using the settlement function corresponding to the electronic money type that is confirmed to be present by the settlement acquisition unit 62. On the other hand, when the identification data stored in the limitation information storage area 46 is two or more types, the electronic money type narrowing down unit 63 displays the electronic money types that are confirmed to be present by the settlement acquisition unit 62 on a display or the like and lets a user select any one of them, and causes the settlement unit 61 to start the settlement process using the settlement function corresponding to the selected electronic money type.

<2-3> Flow of Process in Settlement System

Figure 11:
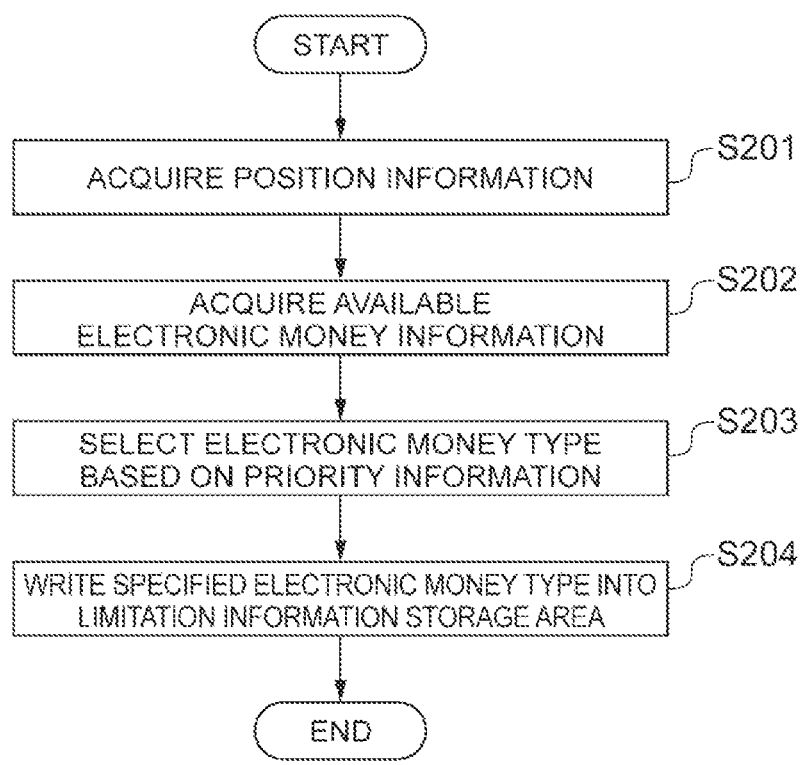
FIG. 11 is a flowchart showing the flow of the preparation process performed prior to the settlement process in the settlement system.
Figure 12:
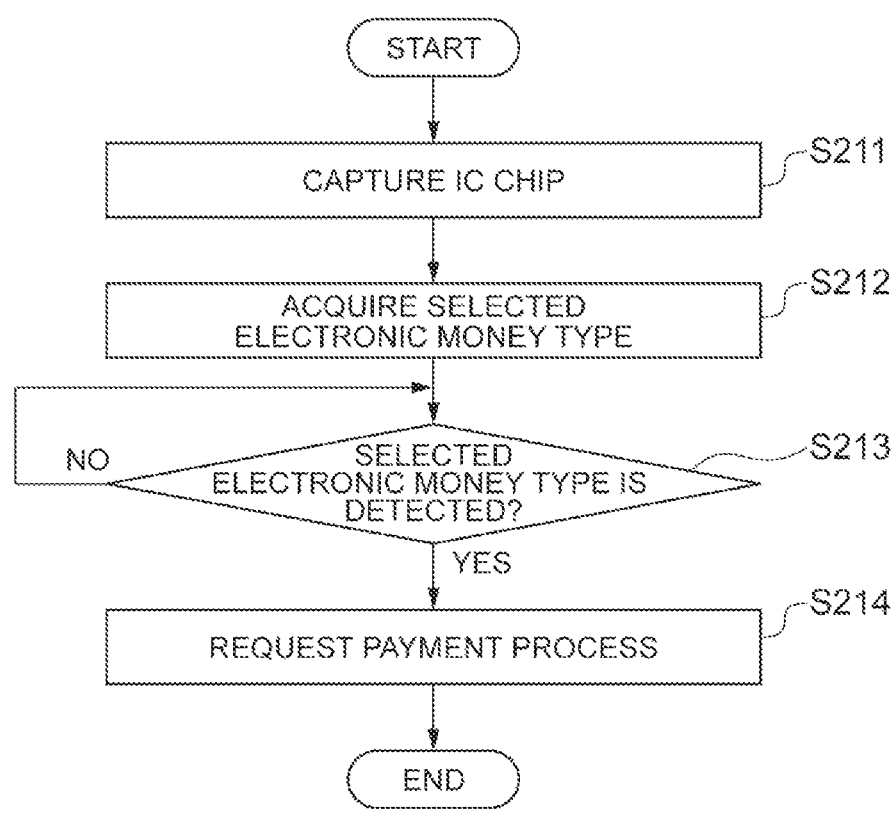
FIG. 12 is a flowchart showing the flow of the settlement process in the settlement system 200 after the preparation process.

The flow of the process (settlement method) executed in the settlement system 200 is described hereinafter with reference to FIGS. 11 and 12. FIG. 11 is a flowchart showing the flow of the preparation process performed prior to the settlement process in the settlement system 200, and FIG. 12 is a flowchart showing a part of the flow of the settlement process in the settlement system 200 after the preparation process.

First, the flow of the preparation process performed prior to the settlement process in the settlement system 200 is described hereinafter with reference to FIG. 11. In the following, the case where a user of the mobile terminal 4 visits a store and eats and drinks, for example, and then performs the payment process with electronic money is described as one example.

First, when a user of the mobile terminal 4 enters a store, the user holds the mobile terminal 4 against a reader/writer for discount coupon issuance (not shown) or the like that is located at the entrance of the store, for example. Upon that act as a trigger, information about a discount coupon is displayed on the mobile terminal 4, and the mobile terminal 4 performs positioning, thereby acquires position information indicating the current position of the mobile terminal 4, and transmits it to the information server 5 (Step S201).

Then, the information server 5 inquires to the position-type database 51 about a terminal type corresponding to the received position information and further inquires to the type-availableness database 52 about an electronic money type (available electronic money information as one example of specifying information) corresponding to the obtained terminal type and thereby acquires and transmits the obtained available electronic money information to the mobile terminal 4 (Step S202).

Then, the mobile terminal 4 acquires a predetermined number of electronic money types sequentially in descending order of priority in the mobile terminal 4 among the electronic money types indicated by the received available electronic money information by making an inquiry to the electronic money priority information database 42 (Step S203). The mobile terminal 4 then writes the identification data of the acquired electronic money type to the limitation information storage area 46 (Step S204).

By the procedure shown in FIG. 11, the identification data of a predetermined number of electronic money types in descending order of priority out of the electronic money types that are usable in the mobile terminal 4 among the electronic money types that are acceptable in the settlement terminal located near the current position of the mobile terminal 4 is written to the limitation information storage area 16 of the IC chip 41.

A part of the flow of the settlement process in the settlement system 200 after the preparation process is described hereinafter with reference to FIG. 12.

First, a user of the mobile terminal 4 holds the mobile terminal 4 against the reader/writer 6 for the settlement process. Upon that act as a trigger, the reader/writer 6 captures the IC chip 41 (Step S211).

Next, the reader/writer 6 acquires the identification data of the electronic money type stored in the limitation information storage area 46 from the IC chip 41 (Step S212).

Then, the reader/writer 6 sequentially inquires to the IC chip 41 about whether the acceptable electronic money types are usable for the payment process in the IC chip 11 until the presence of the electronic money types corresponding to all the identification data acquired from the IC chip 41 is confirmed. Then, it determines whether the presence of the electronic money types corresponding to all the identification data acquired from the IC chip 41 is confirmed or not (Step S213). When the selected electronic money type is not detected, the determination process is performed again.

On the other hand, when the selected electronic money type is detected, the reader/writer 6 stops the processing of detecting the presence of another acceptable electronic money type. Then, the reader/writer 6 starts a request for the payment process with the electronic money type that is detected by the above-described inquiry process (Step S214). The settlement process is thereby performed between the IC chip 41 and the reader/writer 6.

Note that, in the case where the number of identification data stored in the limitation information storage area 46 is plural, after the presence of the electronic money types corresponding to all the identification data is confirmed, the confirmed electronic money types may be displayed on a display (not shown) to allow a user to select the electronic money type to be used for the payment process. In this case also, the processing of sequentially making inquires about the electronic money types is stopped at the point of time when the presence of the electronic money type corresponding to the specified identification data is confirmed, thereby reducing the time required to confirm the electronic money type.

Further, in the case where the presence of the electronic money types respectively corresponding to all the identification data stored in the limitation information storage area 46 of the IC chip 41 is not confirmed even after inquiries about all the electronic money types acceptable in the reader/writer 6 are done, the reader/writer 6 starts a request for the payment process with the electronic money type useable for the payment process in the IC chip 41 of the mobile terminal 4 among the electronic money types acceptable in the reader/writer 6.

<2-4> Settlement Program and Payment Program

A settlement program and a payment program for causing computers to function as the reader/writer 6 and the mobile terminal 4, respectively, are provided in the form of being recorded in a static manner on a recording medium such as CD-ROM, DVD-ROM or semiconductor memory, for example. Further, the settlement program and the payment program may be provided as computer data signals superimposed onto carrier waves through a communication network.

<3> Third Embodiment

<3-1> Outline of Processing Procedure in Settlement System

Figure 13:
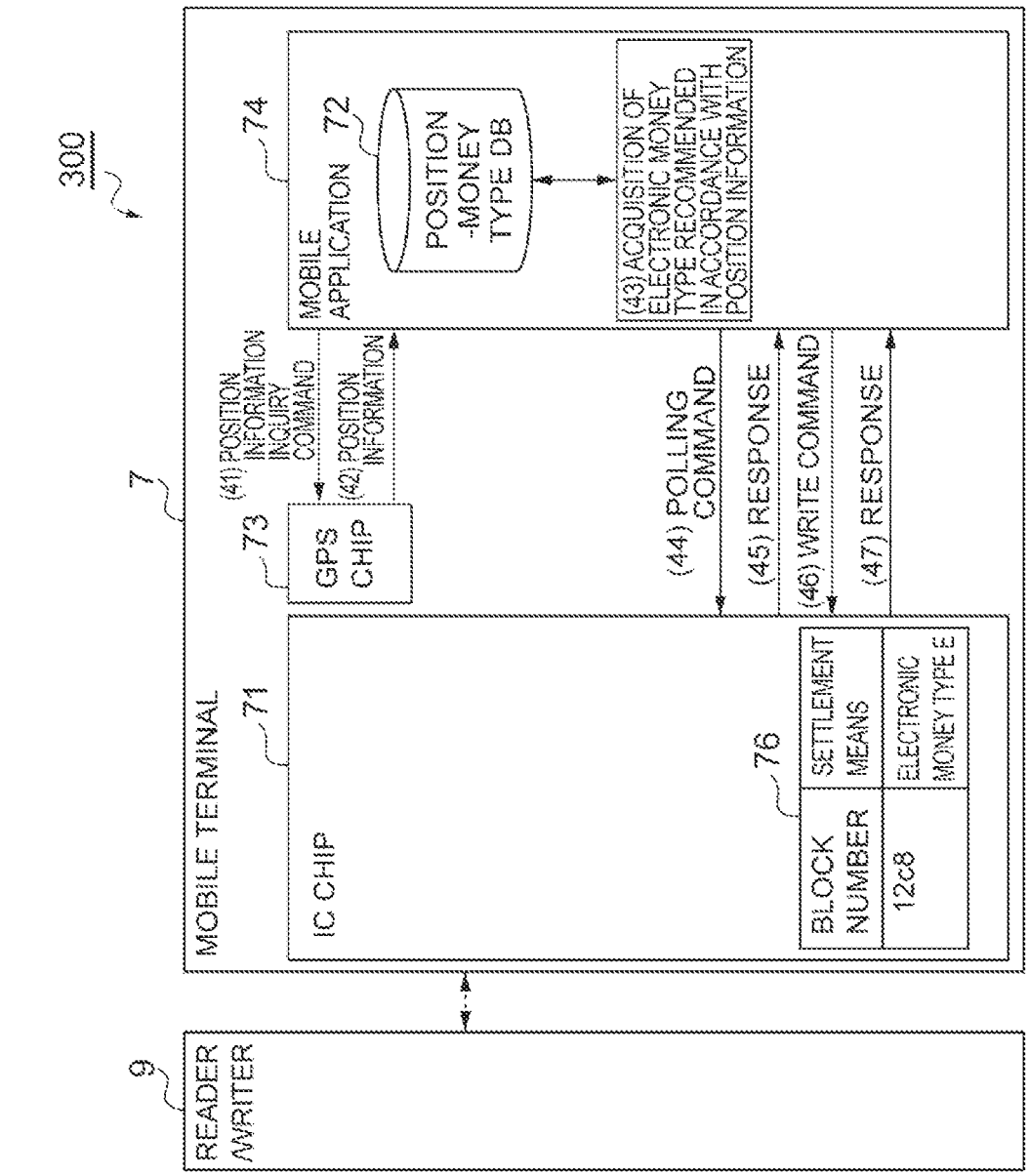
FIG. 13 is a procedure explanatory diagram illustrating the procedure of a preparation process performed prior to a settlement process in a settlement system according to a third embodiment.

A settlement system according to a third embodiment is described hereinafter with reference to FIG. 13. FIG. 13 is a procedure explanatory diagram illustrating the procedure of a preparation process performed prior to a settlement process in the settlement system 300. Note that the procedure of a settlement process performed in the settlement system 300 after the preparation process is the same as that in the settlement system 200 according to the second embodiment and thus not redundantly described.

The settlement system 300 is a system that includes a mobile terminal 7 (one example of a payment terminal) and a reader/writer 9 (one example of a settlement terminal). The mobile terminal 7 is a terminal that performs the payment process with an electronic payment function (one example of payment means), such as a mobile phone terminal or a smartphone with electronic money functionality, for example. The reader/writer 9 is a device that is placed in a POS cash register or the like located in a store and the like and accepts the payment process by the mobile terminal 7 using the corresponding settlement function (one example of settlement means).

Note that the mobile terminal 7 includes a contactless IC chip 71 (one example of a payment terminal), a position-money type database 72, a GPS chip 73, and a mobile application 74 (an application program for the mobile terminal 7).

The IC chip 71 is a chip that enables the payment process with a plurality of types of electronic money. Note that the functions of the IC chip 71 are the same as the functions of the IC chip 41.

The position-money type database 72 is a database that stores identification information of an electronic money type for narrowing down and selecting one from a plurality of types of electronic money (electronic money types) that are usable in the mobile terminal 7 based on the tendency of the payment process in the mobile terminal 7 (for example, information about an electronic money type that is recommended to be selected based on the history of positions and date and time of the payment process). The GPS chip 73 is an electronic module that measures the position of the mobile terminal 7.

The mobile application 74 is an application program that has a function of performing a preparation process by accessing the IC chip 71. Note that the functions of the mobile application 74 are the same as the functions of the mobile application 44 except for those explicitly described below.

First, the procedure of a preparation process that is performed prior to a settlement process in the settlement system 300 is described with reference to FIG. 8. In the following, the case where a user of the mobile terminal 7 visits a store and eats and drinks, for example, and then performs the payment process with electronic money is described as one example.

First, when a user of the mobile terminal 7 enters a store, the user holds the mobile terminal 7 against a reader/writer for discount coupon issuance (not shown) or the like that is located at the entrance of the store, for example. Upon that act as a trigger, information about a discount coupon is displayed on the mobile terminal 7, and the mobile application 74 transmits a command to inquire about position information corresponding to the current position of the mobile terminal 7 to the GPS chip 103 (procedural step 41). Note that, instead of using the act that a user of the mobile terminal 7 holds the mobile terminal 7 against a reader/writer for discount coupon issuance or the like as a trigger, detection of SSID by the mobile terminal 1 may be used as a trigger, or the GPS chip 73 may perform positioning, which is described below, on a regular basis.

Next, the GPS chip 73 performs positioning and transmits position information indicating the current position of the mobile terminal 7 and positioning time information to the mobile application 74 (procedural step 42), and the mobile application 74 inquires to the position-money type database 72 about an electronic money type that is recommended to be selected based on the history of the position information and the positioning time information and thereby acquires it (procedural step 43). It is assumed in this example that the recommended electronic money type is "electronic money type E".

Then, the mobile application 74 sends a command (polling) for capturing the IC chip 71 (which does not designate a specific code) to the IC chip 71 (procedural step 44). In response thereto, the IC chip 71 sends a response containing unique ID information and the like back to the mobile application 74 (procedural step 45).

After that, it is assumed that a process in compliance with the technical specification and the management regulations of the IC card (for example, authentication etc.) is performed between the mobile application 74 and the IC chip 71, for example.

After that, the mobile application 74 sends a command (write) for writing identification data of the "electronic money type E", which is the above-described usable electronic money type, to the limitation information storage area 76 (which is the location specified by the block number "12c8" in this example, and it is assumed that data can be written and read without need of key information; the same applies below) of the IC chip 71 to the IC chip 71 (procedural step 46). Then, the IC chip 71 sends a response indicating the success of writing of the identification data of the "electronic money type E" to the designated area (the limitation information storage area 76 with the block number "12c8") back to the mobile application 74 (procedural step 47).

By the procedure shown in FIG. 13, the identification data of the electronic money type (which is the "electronic money type E" in the above example) that is recommended based on the history of tendency of using electronic money in the past in the vicinity of the current position of the mobile terminal 7 is written to the limitation information storage area 46 of the IC chip 71.

Specifically, in the case where there is a record indicating that the electronic money type E is used frequently at a specific business district (position) in the early weekday morning (date and time) and there is a tendency indicating that the electronic money type W is used frequently at a specific entertainment district (position) in the holiday evening (date and time), writing of block data of the electronic money type E is performed (preset) without communication with a server (for example, the information server 2) located outside the mobile terminal 7 when the position is detected at the business district in the early weekday morning.

Further, writing of block data of the electronic money type W is performed (preset) without communication with a server (for example, the information server 2) located outside the mobile terminal 7 when the position is detected at the entertainment district in the holiday evening.

<3-2> Configuration of Settlement System

Figure 14:
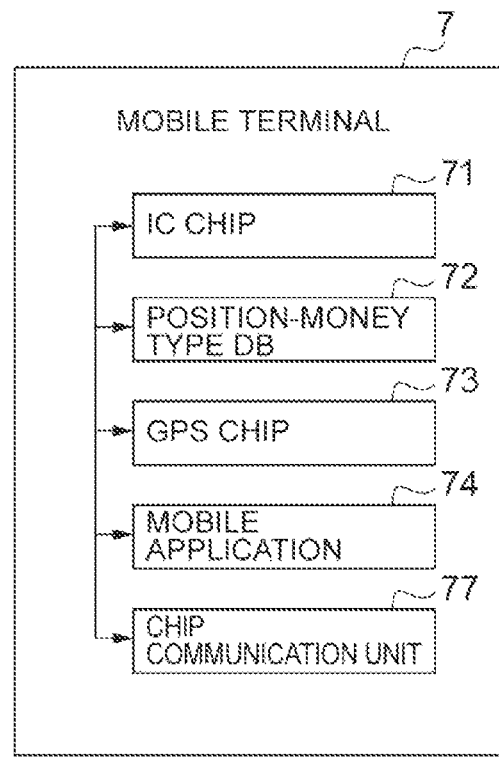
FIG. 14 is a block diagram illustrating the configuration of the mobile terminal included in the settlement system.

The configuration of the settlement system 300 is described hereinafter with reference to FIGS. 4 and 14. FIG. 14 is a block diagram illustrating the configuration of the mobile terminal 7 included in the settlement system 300. Note that the configuration of the reader/writer 9 included in the settlement system 300 is the same as that of the reader/writer 6 included in the settlement system 200 according to the second embodiment and not redundantly described.

As shown in FIG. 4, the mobile terminal 7 is a small computer terminal that is composed of hardware such as a CPU 101 (Central Processing Unit), a RAM 102 (Random Access Memory), a ROM 103 (Read Only Memory), an operating unit 104, a wireless communication unit 105, a display 106, an antenna 107, and various chips 108 as principal physical components. Those components operate so that the functions of the mobile terminal 7 are exerted.

As shown in FIG. 14, the mobile terminal 7 is composed of the IC chip 71, the position-money type database 72, the GPS chip 73, the mobile application 74, and a chip communication unit 77 as principal functional components.

The IC chip 71 is a semiconductor integrated circuit unit that is capable of performing the payment process with a plurality of electronic money types. The plurality of electronic money types include "electronic money type E", "electronic money type W" and "electronic money type n", for example.

The position-money type database 72 is a database unit that stores identification information (selection information) of electronic money types for narrowing down and selecting some electronic money types from a plurality of types of electronic money (electronic money types) that are usable in the mobile terminal 7 based on the tendency of performing the payment process in the mobile terminal 7 (for example, information about an electronic money type that is recommended to be selected based on the history of positions and date and time of the payment process).

The GPS chip 73 is a positioning unit that acquires position information (which is the position where the payment process is performed) related to the current position of the mobile terminal 7 and the date and time by using GPS (Global Positioning System).

The mobile application 74 is an application unit that transmits the position information acquired by the GPS chip 73 and the date and time information when positioning by the GPS chip 73 is performed to the position-money type database 72 to inquire about information of an electronic money type that is recommended to be selected in accordance with the position information and the date and time information and thereby acquires the information.

The chip communication unit 77 is a communication unit that controls near field communication that is performed with the reader/writer 9.

<3-3> Flow of Process in Settlement System

Figure 15:
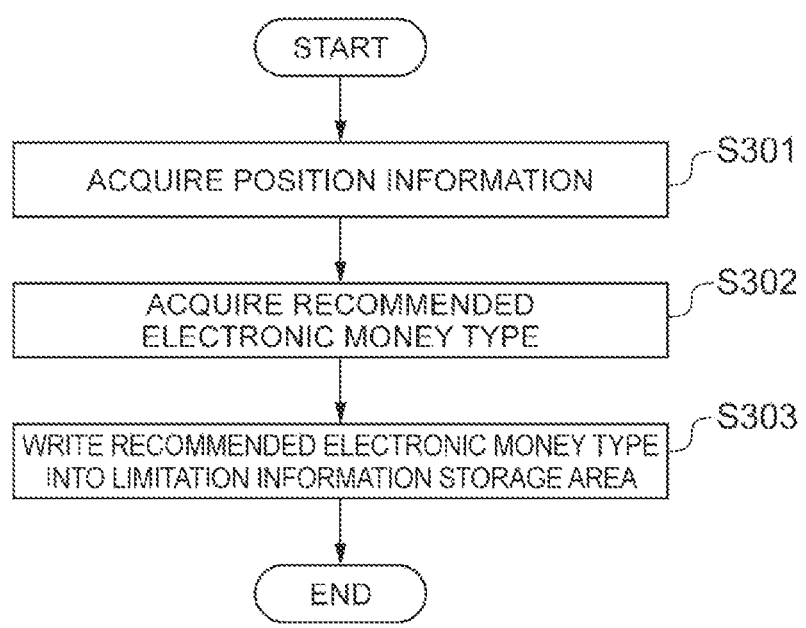
FIG. 15 is a flowchart showing the flow of the preparation process performed prior to the settlement process in the settlement system.

The flow of the process (settlement method) executed in the settlement system 300 is described hereinafter with reference to FIG. 15. FIG. 15 is a flowchart showing the flow of the preparation process performed prior to the settlement process in the settlement system 300. Note that the flow of the settlement process performed in the settlement system 300 after the preparation process is the same as that in the settlement system 200 according to the second embodiment and thus not redundantly described.

In the following, the case where a user of the mobile terminal 7 visits a store and eats and drinks, for example, and then performs the payment process with electronic money is described as one example.

First, when a user of the mobile terminal 7 enters a store, the user holds the mobile terminal 7 against a reader/writer for discount coupon issuance (not shown) or the like that is located at the entrance of the store, for example. Upon that act as a trigger, information about a discount coupon is displayed on the mobile terminal 7, and the mobile terminal 7 performs positioning, thereby acquires position information indicating the current position of the mobile terminal 7 (Step S301). Then, the mobile terminal 7 acquires identification information that is capable of identifying (identifies) an electronic money type that is recommended to be selected based on the position information and the positioning time information (Step S302).

The mobile terminal 7 then writes the identification data of the selected electronic money type to the limitation information storage area 76 (Step S303).

<3-4> Settlement Program and Payment Program

A settlement program and a payment program for causing computers to function as the reader/writer 9 and the mobile terminal 7, respectively, are provided in the form of being recorded in a static manner on a recording medium such as CD-ROM, DVD-ROM or semiconductor memory, for example. Further, the settlement program and the payment program may be provided as computer data signals superimposed onto carrier waves through a communication network.

<4> Advantageous Effects of Invention

In the settlement systems 100, 200 and 300, the limitation information (the number of types, identification data) that contributes to limit a plurality of electronic money types to some of electronic money types is stored in the IC chip, and the limitation information stored in the IC chip is acquired by the reader/writer, and then the processing of making an inquiry about another electronic money type is stopped when the presence of the electronic money type that is limited by the acquired limitation information is confirmed in the IC chip.

Therefore, the processing of confirming the presence of electronic money types that are not usable for the payment process in the mobile terminal (IC chip) is skipped in the reader/writer, thereby reducing a certain length of wait time in the inquiry process by the reader/writer.

As a result, the time required for inquiries by the settlement terminal having the function of sequentially making inquiries about acceptable electronic types is reduced.

<5> Alternative Example

Although the configuration where the position-money type database 72 is included in the mobile terminal 7 is described in the third embodiment of the invention, the position where the position-money type database 72 is located is not particularly limited, and the position-money type database 72 may be included in the information server 2 according to the first embodiment of the invention, for example.

Further, in the first, second and third embodiments of the invention, the form where a polling command for capturing the IC card or the IC chip is used and the form where commands for acquiring an area in the IC card or the IC chip and unique ID of the area are used are described as examples based on particular technical specifications. The present invention, however, is not limited to those, and it may be implemented in form in compliance with the technical specification of the settlement system to which it is applied.

INDUSTRIAL APPLICABILITY

According to the present invention, the time required for inquiries by the settlement terminal having the function of sequentially making inquiries about acceptable payment means is reduced.

REFERENCE SIGNS LIST 1,4,7 . . . mobile terminal, 2,5 . . . information server, 3,6,9 . . . reader/writer, 11,41,71 . . . IC chip, 12 . . . electronic money list database, 13,43,73 . . . GPS chip, 14,44,74 . . . mobile application, 16,46,76 . . . limitation information storage area, 17,47,77 . . . chip communication unit, 21,51 . . . position-type database, 22,52 . . . type-availableness database, 31,61 . . . settlement unit, 32,62 . . . settlement acquisition unit, 33,63 . . . electronic money type narrowing down unit, 42 . . . electronic money priority information database, 72 . . . position-money type database, 100,200, 300 . . . settlement system, 101,201 . . . CPU, 102,202 . . . RAM, 103,203 . . . ROM, 104 . . . operating unit, 105 . . . wireless communication unit, 106 . . . display, 107 . . . antenna, 108 . . . various chips, 204 . . . communication module, 205 . . . auxiliary storage device.

The invention claimed is:

1. A settlement system comprising:
a payment terminal comprising a plurality of payment functions each configured to perform a payment process; and
a settlement terminal configured to communicate with the payment terminal via near field communication,
the settlement terminal comprising a first storage configured to store a list of a plurality of payment functions acceptable in the settlement terminal to perform the payment process, the plurality of acceptable payment functions being determined according to a type of the settlement terminal,
the settlement terminal further comprising:
at least one memory operable to store program code; and
at least one processor operable to read said program code and operate as instructed by said program code, said program code comprising:
inquiry code configured to cause at least one of the at least one processor of the settlement terminal to sequentially repeat a cycle of sending an inquiry to the payment terminal as to whether one of the plurality of acceptable payment functions, selected from the list in a predetermined order, is present in the payment terminal, and receiving a corresponding response to the inquiry from the payment terminal, wherein sequentially repeating the cycle is performed for remaining payment functions on the list until sending the inquiry by the inquiry code is stopped by stopping code; and
payment process accepting code configured to cause at least one of the at least one processor of the settlement terminal to accept the payment process; performed by one payment function via the near field communication, the one payment function being specified among payment functions confirmed to be present in the payment terminal by the inquiry code, wherein
the payment terminal further comprises:
a second storage;
at least one second memory operable to store second program code; and
at least one second processor operable to read said second program code and operate as instructed by said second program code, said second program code comprising:
first information acquisition code configured to cause at least one of the at least one second processor to acquire first information for identifying the settlement terminal;
second information acquisition code configured to cause at least one of the at least one second processor to acquire second information indicating the plurality of acceptable payment functions based on the acquired first information from a first database configured to store information about the plurality of acceptable payment functions in association with the settlement terminal; and
code configured to cause at least one of the at least one second processor to generate limitation information indicating at least one overlap between the plurality of payment functions in the payment terminal and the plurality of acceptable payment functions indicated by the acquired second information, and write the generated limitation information into the second storage, and
said program code of the settlement terminal further comprises:
limitation information acquisition code configured to cause at least one of the at least one processor to acquire the limitation information stored in the second storage via the near field communication before the cycle is started, and
the stopping code configured to cause at least one of the at least one processor to, in response to presence of at least one payment function corresponding to the at least one overlap indicated by the limitation information acquired by the limitation information acquisition code being confirmed by the inquiry code in a current cycle, stop sending the inquiry by the inquiry code to the payment terminal in a subsequent cycle.

2. The settlement system according to claim 1, wherein the limitation information stored in the second storage comprises a number of a type of a payment function usable for the payment process in the payment terminal, and
the stopping code causes at least one of the at least one processor of the settlement terminal to stop sending the inquiry by the inquiry code when presence of the number of the type of the payment function as indicated by the limitation information acquired by the limitation information acquisition code is confirmed.

3. The settlement system according to claim 2, wherein the second program code further comprises:
code that causes at least one of the at least one second processor to store a number of an overlap between one or more payment functions acquired by the specifying information acquisition code and the payment function usable for the payment process in the payment terminal as the number of the type into the second storage.

4. The settlement system according to claim 1, wherein
the limitation information stored in the second storage further comprises identification information capable of identifying the at least one payment function corresponding to the at least one overlap indicated by the limitation information, and the stopping code causes at least one of the at least one processor of the settlement terminal to stop sending the inquiry by the inquiry code when presence of all of the at least one payment function identified by the identification information included in the limitation information acquired by the limitation information acquisition code is confirmed by the inquiry code.

5. The settlement system according to claim 4, wherein
the plurality of payment functions usable for the payment process in the payment terminal include order information indicating priorities, and the second program code further comprises, code that causes at least one of the at least one second processor to select one payment function with a highest priority indicated by the order information stored in the storage among one or more payment functions acquired by the specifying information acquisition code and store identification information of the selected one payment function into the storage.

6. The settlement system according to claim 4, wherein
the second program code further comprises, code configured to cause at least one of the at least one second processor to store identification information of a payment function overlapping between one or more payment functions acquired by the specifying information acquisition code and a payment function usable for the payment process in the payment terminal into the second storage.

7. The settlement system according to claim 1, wherein
the specifying information acquisition code causes at least one of the at least one processor of the payment terminal to acquire position information indicating a current position of the payment terminal acquired by a positioning processor as the first information for identifying the settlement terminal and acquire at least one payment function corresponding to the position information from a second database configured to store position information indicating a position of the settlement terminal and the settlement terminal in association with each other and the first database.

8. A settlement terminal which communicates with a payment terminal via near field communication, the settlement terminal comprising:

a first storage configured to store a list of a plurality of payment functions acceptable in the settlement terminal to perform the payment process, the plurality of acceptable payment functions being determined according to a type of the settlement terminal;

at least one memory operable to store program code; and at least one processor operable to read said program code and operate as instructed by said program code, said program code comprising:

inquiry code configured to cause at least one of the at least one processor of the settlement terminal to sequentially repeat a cycle of sending an inquiry to the payment terminal as to whether one of the plurality of acceptable payment functions, selected from the list in a predetermined order, is present in the payment terminal and receiving a corresponding response to the inquiry from the payment terminal, wherein sequentially repeating the cycle is performed for remaining payment functions on the list until sending the inquiry by the inquiry code is stopped by stopping code; and payment process accepting code configured to cause at least one of the at least one processor of the settlement terminal to accept the payment process; performed by one payment function via the near field communication, the one payment function being specified among payment functions confirmed to be present in the payment terminal by the inquiry code, said program code further comprising:

limitation information acquisition code configured to cause at least one of the at least one processor of the settlement terminal to acquire, from the payment terminal further comprising a second storage configured to store limitation information, the limitation information indicating at least one overlap between a plurality of payment functions in the payment terminal and the plurality of acceptable payment functions, and the stopping code configured to cause at least one of the at least one processor of the settlement terminal to, in response to presence of at least one payment function corresponding to the at least one overlap indicated by the limitation information acquired by the limitation information acquisition code being confirmed by the inquiry code in a current cycle, stop sending the inquiry by the inquiry code to the payment terminal in a subsequent cycle, wherein the payment terminal acquires first information for identifying the settlement terminal, and acquires second information indicating the plurality of acceptable payment functions based on the acquired first information from a first database configured to store information about the plurality of acceptable payment functions in association with the settlement terminal, and the limitation information is generated based on the plurality of acceptable payment functions indicated by the acquired second information and the plurality of payment functions in the payment terminal.

9. A settlement method by a settlement terminal which communicates with a payment terminal via near field communication, the settlement method comprising:

storing, in a first storage, a list of a plurality of payment functions acceptable in the settlement terminal to perform the payment process, the plurality of acceptable payment functions being determined according to a type of the settlement terminal;

sequentially repeating, by the settlement terminal, a cycle of sending an inquiry to a payment terminal as to whether one of the plurality of acceptable payment functions, selected from the list in a predetermined order, is present in the payment terminal and receiving a corresponding response to the inquiry from the payment terminal, wherein sequentially repeating the cycle is performed for remaining payment functions on the list until sending the inquiry is stopped, and accepting the payment process performed by one payment function via the near field communication, the one payment function being specified among payment functions confirmed to be present in the payment terminal, the settlement method further comprising:

acquiring, from the payment terminal further comprising a second storage configured to store limitation information limitation information, the limitation information indicating at least one overlap between a plurality of payment functions in the payment terminal and the plurality of acceptable payment functions, and in response to presence of at least one payment function corresponding to the at least one overlap indicated by the limitation information being confirmed in a current cycle, stopping sending the inquiry to the payment terminal in a subsequent cycle, wherein the payment terminal acquires first information for identifying the settlement terminal, and acquires second information indicating the plurality of acceptable payment functions based on the acquired first information from a first database configured to store information about the plurality of acceptable payment functions in association with the settlement terminal, and the limitation information is generated based on the plurality of acceptable payment functions indicated by the acquired second information and the plurality of payment functions in the payment terminal.

* * * * *